Figure 1:
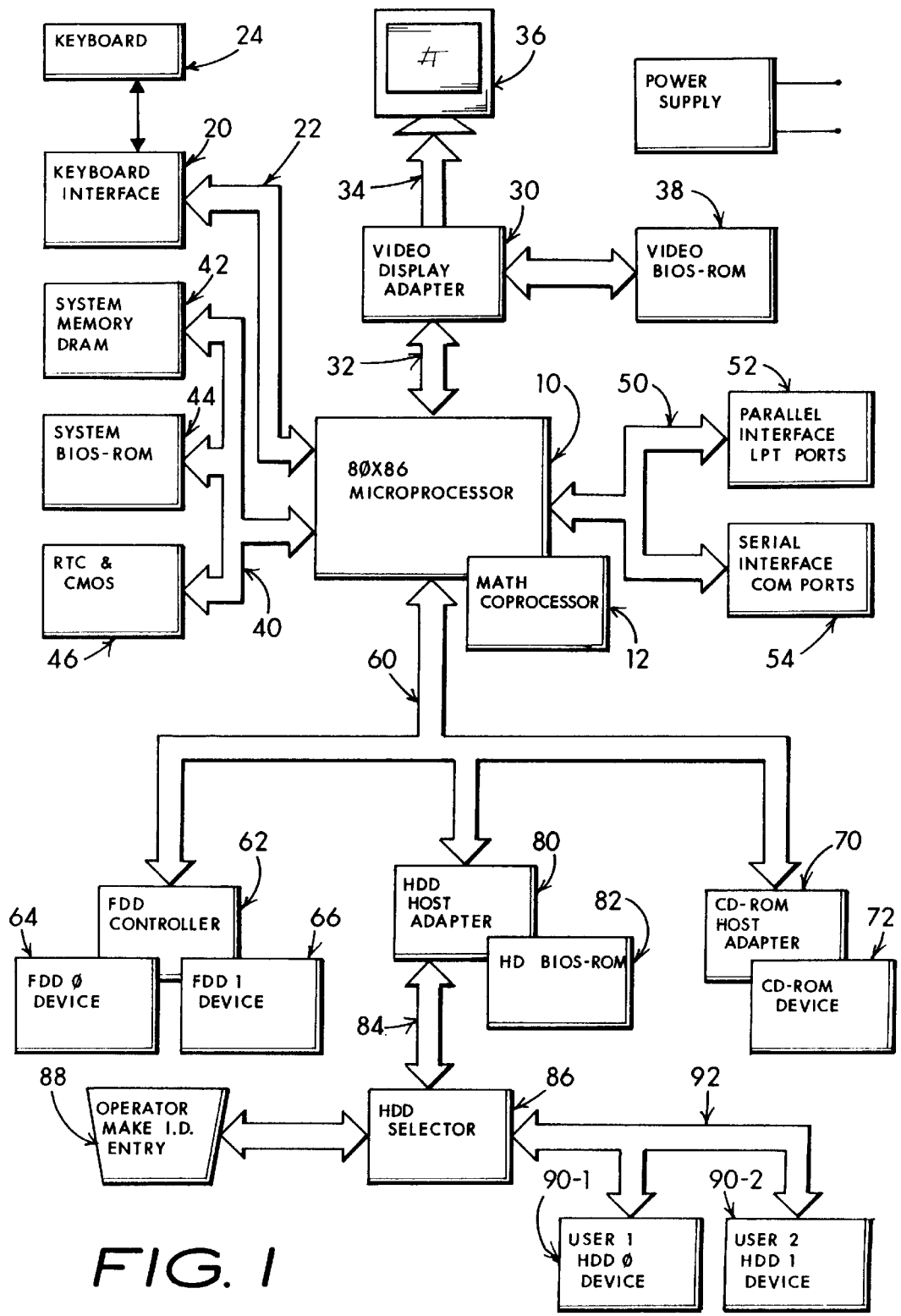

United States Patent [19]
Weber

[11] Patent Number: 6,052,781
[45] Date of Patent: Apr. 18, 2000

[54] MULTIPLE USER COMPUTER INCLUDING ANTI-CONCURRENT USER-CLASS BASED DISJUNCTIVE SEPARATION OF PLURAL HARD DRIVE OPERATION

[75] Inventor: Harold J. Weber, Holliston, Mass.

[73] Assignee: Savvy Frontiers Property Trust, Centerville, Mass.

[21] Appl. No.: 08/803,636

[22] Filed: Feb. 21, 1997

[51] Int. Cl.$^7$ .................................................. G06F 13/00
[52] U.S. Cl. .............................. 713/200; 713/2; 713/100
[58] Field of Search ............................ 395/183.12, 186, 395/187.01, 188.01, 652, 653, 828, 892; 380/4, 23, 25; 713/200, 201, 202, 100; 710/8, 72; 714/36

[56] References Cited

U.S. PATENT DOCUMENTS

| 5,012,514 | 4/1991 | Renton ........................................ 380/4 |
| 5,214,695 | 5/1993 | Arnold et al. .............................. 380/4 |

(List continued on next page.)

OTHER PUBLICATIONS

"Tiny BIOS takes on an expanding role", by Lawrence J. Curran, Electronic Business Today Magazine, Mar. 1996, p. 77.

"Lean, mean storage machines", by Maury Wright, EDN Magazine, Nov. 7, 1996, p. 51.

"Hold Everything", by Chris O'Malley, PC–Computing Magazine, Oct. 1996, p. 172.

"Dual Boot the Hardware Way", by John Douglas Young, Alfred Poor, PC Magazine, Feb. 4, 1997, p. 288.

"The Undocumented PC: A Programmer's Guide to I/O, CPUs, and Fixed Memory Areas", pp. 467–562, book by Frank van Gilluwe, Addison–Wesley Publishing Co., 1994, ISBN 0–201–62277–7.

"The Hardware Bible", 3rd ed., book by Winn L. Rosch, Sams Publishing Co., 1994, ISBN 1–56686–127–6.

"The Indispensable PC Hardware Book", 2nd ed., book by Hans–Peter Messmer, Addison–Wesley Publishing Co., 1995, ISBN 0–201–87697–3.

U.S. application No. 08/635,778, Weber, filed Apr. 22, 1996.

Primary Examiner—William M. Treat

[57] ABSTRACT

A computer sharing system which adapts a computer's hardware resources to providing virtual dual system operation for several non-concurrent system users. A separate hard disk drive including a full complement of boot, operating system, program and data file software is provided for each of the non-concurrent system users. Access by one system user to another system user's hard disk drive and attendant files is absolutely denied thereby preventing corruption of one user's hard disk dive files by another user's carelessness or malicious intent, or through unique setup adaptation of one user's program files which may otherwise interact with and impose unwanted changes on another's program file's operational performance. Each of the separate hard disk drives may be uniquely formatted to service totally different operating systems, including boot track code, in support of various operating systems including MS-DOS, Windows-NT, OS/2, Unix and others. By definition, each separate hard disk drive may be a physically distinct hard disk drive unit, or be more economically embodied as several separately utilized media platters driven by a common hard disk drive mechanisim and having user distinctive READ and WRITE channel control for each media platter. The absolute denial of a system user's access to another system user's assigned hard disk drive may be cracked open to an limited extent whereby READ-ONLY access may be permitted. Additionally, a third hard disk drive may be enabled to be shared by one or more system users in any combination of READ-ONLY, and READ and WRITE modes. My objective is to deliver the independent performance which until now was proffered only by two completly separate computers in the economic form of one set of computer hardware offering at least two virtually separate operating systems and sets of supporting software whereby one system user is absolutely blocked from corrupting another system user's uniquely configured software and data files.

24 Claims, 19 Drawing Sheets

U.S. PATENT DOCUMENTS

| | | | |
|---|---|---|---|
| 5,280,398 | 1/1994 | Wade et al. | 360/60 |
| 5,363,446 | 11/1994 | Ruppertz et al. | 380/4 |
| 5,375,243 | 12/1994 | Parzych et al. | 380/4 |
| 5,434,562 | 7/1995 | Reardon | 380/4 |
| 5,497,490 | 3/1996 | Harada et al. | 395/653 |
| 5,542,044 | 7/1996 | Pope | 395/186 |
| 5,586,301 | 12/1996 | Fisherman et al. | 713/200 |
| 5,687,379 | 11/1997 | Smith et al. | 395/726 |
| 5,754,821 | 5/1998 | Cripe et al. | 713/200 |
| 5,787,491 | 7/1998 | Merkin et al. | 380/4 |
| 5,799,145 | 8/1998 | Imai et al. | 395/188.01 |
| 5,805,800 | 9/1998 | Kotani et al. | 395/186 |
| 5,809,230 | 9/1998 | Pereira | 395/186 |
| 5,859,968 | 1/1999 | Brown et al. | 713/200 |
| 5,878,210 | 3/1999 | Kong | 380/25 |
| 5,923,841 | 7/1999 | Lee | 713/202 |

MULTIPLE USER COMPUTER INCLUDING ANTI-CONCURRENT USER-CLASS BASED DISJUNCTIVE SEPARATION OF PLURAL HARD DRIVE OPERATION

BACKGROUND OF MY INVENTION

When a desktop or a notebook computer's hardware resources are shared by several nonconcurrent users, conventional wisdom finds that a secondary user's inadvertent corruption of a primary user's files and programs is a potentially troublesome problem. Such data corruption may occur due to simple operating error, malicious intent, accidental modification caused by installation of new and sometimes inherently faulty software, and usage of aggressive code-level utility programs such as Norton's Utilities which may unwittingly act to erroneously modify bytes of binary code just about anywhere in a file or on a hard disk.

A more subtle problem is an introduction of a software virus into a mutually shared boot sector or operating system, particularly when the virus is (albeit inadvertently) introduced by one user, unbeknownst to the other user. While no computer virus can physically destroy (e.g., literally destroy) a hard drive, the data can be erased or irreparably damaged by the virus. This includes possible corruption of the boot sector of the hard disk drive. With about 7,500 known viruses travelling around in the software world (with about 1,400 discovered in 1995 alone!) it behooves the prudent user to concern himself with realistic protection if he considers his data and program files vital to his business wellbeing.

The ultimate result is a catastrophic failure of the primary user's software operability, file data corruption, or loss and failure of file retrieval functions. Conversely, the primary user may similarly corrupt operational integrity of the secondary user's files or programs.

One user may also unintentionally alter the operating characteristics of another user's applications through modifications to shared shell software components including SYSTEM.INI, WIN.INI, SYSTEM.DAT, USER.DAT, various .POL files, or similar initialization and setup files. Such unintentional cross-file corruption most commonly occurs due to routine installation of new software or changes in operational setup of existing application software. Under a Windows operating shell (i.e., Microsoft Windows 3.11 or Windows 95) the WIN.INI and other .INI and .DAT files are especially vulnerable when different applications programs are installed. In particular, action games can cause havoc with the WIN.INI (and similar .INI) personality file settings in order to optimize game operation at the sacrifice of other office application programs, such as word processors and the like. The result of such unpredictable file corruption may, at the very least, manifest itself as unexpected operation of earlier-installed applications programs.

FIELD OF MY INVENTION

Computers in general and more particularly, a widely used class of small systems commonly known in the art as personal computers (PC) which are most usually based upon an IBM (International Business Machines) architecture originated in the early 1980's and using an Intel "80X86" or equivalent microprocessor sometimes reiteratively produced by AMD, Texas Instruments or Cyrix comprise the field of my invention. More currently, the original PC architecture has been upgraded to AT class and beyond, utilizing contemporary Pentium and Pentium-MMX processors operating with speeds in excess of 200-MHz and commonly having memory (DRAM) capacities ordinarily between 16 MB and 128 MB. MS-DOS, Windows 3.11, Windows 4.0 and Windows-NT operating system configuration delivered by Microsoft are currently by far the most common choice for operating systems used in this or any other microprocessor environment.

This field also includes a far less significant but similar class of computers based upon an Apple Computer configuration using Motorola "68000" series or equivalent microprocessors and sometimes known as McIntosh computers which may utilize System-7, Copeland, Rhapsody or similar narrowly useful Apple Computer oriented proprietary operating systems.

The field also includes a class of Alpha microprocessors utilized in systems delivered by Digital Equipment Corporation and others.

The field may also include other computer operating systems based upon Unix, Linux, CP/M-86, OS/2, Merlin, Warp, QNX, Java, Solaris, and NeXT-Step, and further include a broad variety of independent and proprietary operating systems delivered by IBM and Digital Equipment Corporation (Maynard, Mass.).

My teaching particularly relates to these types of computers when their hardware and software is commonly shared by several non-concurrent users (or classes of users) having diverse application interests or when using substantially different and generally incompatible operating systems such as Microsoft Windows and Unix (or Linux) in the same machine, and when the computer may be equipped with more than one mass storage hard disk drive utilizing IDE, EIDE, ATA, SCSI or equivalent hard disk drive interface bus schemes.

My invention's field further includes centralized small computer systems, commonly referred to as networks and ordinarily involving one computer dedicated as a centralized "server " and running under a group-oriented operating system as Microsoft 's "Windows-NT Server" and connectively running a cluster of one or more satellite "workstations", similarly running under a more individualized operating system such as Microsoft's "Windows-NT Workstation"

CLASS DEFINITION OF A USER

For purpose of my invention a "user" describes one or more individual persons utilizing a computers software resources for a common or similar purpose. For example, office workers typically making use of word processors, data bases and spreadsheets maybe defined as one class of user. Similarly, a different class of user may be persons who regularly install and use games. Another still differing user class may include graphic design or engineering oriented programs, such as CAD or desktop publishing.

Users may be further defined and sub-classed to include different levels of individual users having nearly the same software requirements. For example clerical persons using database and word processing programs may be a user class distinct from management persons also utilizing the computer's resources for word processing or filing. These two categorical levels of users may be advantageously defined as separate classes and hence as different users for purpose of my invention.

In another relationship between users, two distinctly separate users for purpose of my invention's definition may merely be two or more children or teenagers utilizing the same shared computer system, whereby it is desirous that one user can absolutely not accidently or intentionally corrupt another user's data or program files and thereby spoil the efforts of the other nonconcurrent but hardware resource co-sharing user Clearly a user may be surly or plurally defined as being one or any number of individual persons utilizing the computer resources for a common user purpose. As an example, in a home office setting the adult user operating the home office environment may be said to be a "first user", while one or more children using the same computer hardware for essentially conflicting purposes of homework or game playing may collectively be said to be a "second user". A non-concurrent user is further described as any one class of users who may operate the computer entirely independently and at a different time from another class of user. Several factors usually denote this non-concurrency of the users. One is that each non-concurrent user utilizes the computers commonly shared resources, such as the microprocessor, dynamic RAM, display, keyboard and similar elements of a typical computer hardware configuration. Another factor is that a separate hard disk drive loaded with a full complement of operating system and application software is exclusively made available to one user class and to which access by another user class is ordinarily absolutely denied. This exclusion is normally mutual whereby no user may access another user's hard disk dive and each user utilizes his own adaptation of operating system software to start-up and run the computer's shared hardware resources.

PERILS OF PRIOR ART

Personal computers have application for not only being used by more than one user having disparate requirements, but also for supporting widely different operating systems. For example, it is not unusual for a contemporary computer to support various combinations of Windows 3.11, Windows-95, Windows-NT, OS/2, Unix, and Linux operating system shells, and sometimes unadorned MS-DOS or an equivalent lower-level operating system.

A common approach to handling use of two or more operating systems on the same computer machine is to partition the usual hard disk drive into two or more separate virtual disk. For example Windows-95 might be installed to run on Drive C: while Windows-NV/4.0 may be installed to run on Drive D:. Selection of a desired operating system is made during the computer's boot phase, maybe with the assistance of a program such as SYSTEM COMMANDER (V-Communications, Inc., San Jose, Calif.) which prepares the computer for the selected OS during boot. While this approach works fine in many sole-user or undemanding installations, it suffers a fundamental weakness.

Partitioning of a hard disk drive into two or more distinct partitions and assigning each partition to a different operating system or a different user does not safeguard against a susceptibility for catastrophic system failure. A partition creates a virtual disk drive which is not immune to data corruption brought on by an operational mishap introduced in another virtual disk partition which destroys all of a physical hard disk's records. For example, calling a FDISK or equivalent command under the Windows-95 mode while running Drive C: will damage all of the file contents of not only Drive C: but also a virtual Drive D: and any other drive which may have been previously created on the same physical disk drive through partitioning.

Introduction of a virus picked up by one user will usually affect all the operating system related programs and data files on a computer. What this means is that if one user inadvertently introduces the virus during a first period of operation, another user's computer usage during a second period of operation will be affected. This can readily be visualized as problemmatic when, for example, one user utilizes internet access and downloads internet files. It is well known that internet files may relay virus problems and as a result the infection caused by this downloaded virus will likely wreck havoc with another system sharing user, even though the later user never accesses internet and is especially careful about utilizing only virus-free programs.

Similarly, equipping the computer with two or more physical had disk drives does little to prevent essentially the same potential for cross-corruption of hard disk drive data by different users. For example, although a Drive C: may hold all of a Windows-95 program setup (including applications programs, such as word processors, tailored to the Windows-95 interface) and a physically separate Drive D: may hold a uniquely setup version of Windows-NT (again, including applications programs, etc) there is absolutely no foolproof way to prevent an accidental (or malicious) call for FDISK or FORMAT under DOS-7 (typically found under Windows-95) to avoid a potential catastrophic destruction of Drive D: data and the Windows-NT files. Separate system-sharing hard disk drives of this usual sort also have no inherent protection against a virus aimed for corruption of boot track data and ensuring damage to an unsuspecting user's operating needs.

It is generally accepted by computer system oriented gurus that no physical harm can befall a PC system from any command or information entered from the keyboard. Ordinarily, a simple warm reboot will recover an inadvertently crashed (locked-up) computer. The reasonable presumption is that no hardware damage will be incurred solely from mistaken keyboard entries. On the other hand, wrongful keyboard entries can totally destroy software data for every user of a system, even if a hard disk is partitioned and separate partitions are uniquely accessible as distinctly separate virtual disk drives to each of several users. An example of such a problem occurs when a common MS-DOS command such as FDISK is run. Such a command can damage all partitioned data on a hard disk drive media. Boot track and boot sector damage may also be introduced by dumb actions of one user which may prevent another users access to the system.

Absolute isolation of each operating system's integrity of any installed program characteristics is required if full insurance against another user's accidentally (or intentionally) introduced file corruption is to be avoided. Absolute isolation means either one of two (or more) hard disk drive setups which are non-concurrent in operation may be unconditionally and exclusively picked as one or the other by a user having proper credentials.

INTENT OF MY INVENTION

It is a fundamental intent of my invention that several uses may separately share and utilize a common combination of computer hardware without bearing concern for violation or corruption of the other sharing user's personally tailored program formats or file matter stored on a hard disk. Each likely user category is preferably provided with a uniquely assigned and physically separate hard disk drive which may include similar operating system and applications software together with unique files.

In a typical Microsoft based system, this extent of separation implies that each separate hard disk drive necessarily includes its own set of the usual IO.SYS, MSDOS.SYS and COMMAND.COM boot system files as well as sometimes nearly identical copies of Windows shell and a user's application programs, for example a WordPerfect wordprocessor. For example, if two hard disk dives are used and they each have these mentioned files installed, then either of the two hard disk drives may be selected as the boot drive and usually identified as Drive C: for boot purposes. In effect, either one or the other of the two hard disk drives is selected by its respective user and becomes the principal system drive, while the other hard disk drive is disabled and virtually removed from the system.

During initial booting of the computer, a selection process which may include a password usage, determines which one of several hard disk dries will be utilized during the subsequent operating session. Any other hard disk drive is virtually set aside and maintained in absolute isolation, protected against file data trespass or program corruption either through inadvertent overwriting or through quasi-intentional and catastrophic events such as hard disk reformatting, etc.

DESCRIPTION OF PRIOR ART

Computer uses frequently share a common computer hardware combination while following widely divergent operational goals. In particular the widely different software characteristics sometimes introduced by two different users can and often do cause catastrophic interaction between shared software elements of the computer. For example, in a home office environment, it is not unusual that a computer is used both for the business aspects of the home office service, but that also the same computer system may be shared with children or teenagers who run games, schoolwork and other sorts of non-business applications. A common thread through such an arrangement is the computers operating system.

As is well known, an operating software program in the IBM-XT and IBM-AT class of computers (including not only the ubiquitous Intel 80X86 based systems, but also the latest Pentium-based or MMX offerings by a diversity of manufactures including Packard Bell, Compaq, Dell, Gateway-2000, and others) comprises four key software portions: a BIOS which is ordinary unique to each computer model and provided on a custom mask-PROM, EPROM or Flash-PROM device; a DOS disk operating system (typically including the IO.SYS, MSDOS.SYS and COMMAND.COM files), a Windows shell program (e.g., Windows 95, Windows NT, UNIX, OS2, etc); and an application program such as a word processor like Corel's "WordPerfect", a spreadsheet like Microsoft's "Excel", or a data base program like Claris "FileMaker Pro".

A dual-use computer system may have several users who depend upon it for business and office applications, while another group of users may run only games and internet activity. In this latter setting, games such as 7th Level Inc.'s "Monty Python & the Quest for the Holy Grail" and internet related programs such as Symantec's "Internet Fast-Find" may provide the usual application software fare.

A student using a computer shared with someone else is also a threat to the other user's program and file contents. Due to the nature of programming, an inexperienced programmer can introduce byte level errors into hard disk files while attempting to use the I/O instructions for the programming language. For example, in commonplace GW-BASIC the PEEK and POKE instructions, together with file access OPEN, PRINT and WRITE instructions can cause potential havoc with files on a hard disk if used carelessly or without knowledge of the ramifications of their use.

What this shows is that, on one user's end there is serious business related software utilization which might routinely include sensitive or essential files of data as well as carefully customized applications programs having uniquely tailored templates, etc. Meanwhile, on the other user's end equally vital, albeit not necessarily as economically important, game score or homework data files and customized applications are run.

Installation of elaborate contemporary programs often have far-reaching software patch tentacles which are apt to place a few lines of code helter-skelter throughout the shell program (e.g., Windows, OS2, etc.) and sometimes result in overwriting existing code or changing running characteristics, without consideration of operability of other earlier installed programs. Sometimes this may involve overwriting of a first user's file with a second user's conflicting file which may inadvertently have the same filename. Said another way, installation of a new program by a first user class may trash programs run by a second user class. This kind of accidental file damage ordinarily occurs because both use classes commonly depend upon the same underlying DOS operating system and Windows shell environment for their individual software operating support.

SECURITY

Accidental as well as intentional corruption of data files, operating systems and programs persist as a major concern for home computers, small office computers and personal computers (PC) in general. For a home office environment, it is not usual that a high quality computer such as an IBM-AT type machine sporting an Intel Pentium or MMX microprocessor and including 16-megabytes of RAM or more and at least one hard disk drive with a capacity of 1-gigabyte or more is used for the office aspect of the home office in combination with an offering of recreational game playing and homework activities by children.

Installation of game software which generally takes place more frequently than professional level or offices-class application software, can lead to random and unexpected corruption of operating system and application program files as well as accidental overwriting of, or more subtle byte level damage to, office data files.

Game oriented software is notorious for inflicting unexpected overwrites on critical SYSTEM.INI and other system level files, particularly in a Windows (e.g., Microsoft Windows 3.11, Windows-95, Windows-NT, and older Apple McIntosh equivalent) type of user interface shell environments. One reason for this is that game or entertainment software is intended for nearly automatic self-installation (utilizing batch files or special programs such as SETUP.EXE or INSTALL.EXE) without much computer savvy being necessary. Another reason for the problem is that game software is frequently written with less quality control and little concern for interference with co-existing applications programs. As a result, system crashes occur, sometimes with devastating effect on home office or business data due to corruption caused either by the crash itself or more often by an attempt by an inexperienced game user to recover from the crash.

In my invention's hookup, no corruption of co-existing shared-user data, operating system, or application program files are apt to occur in spite of any erroneous recovery attempts by a novice user which might lead to mistaken entry of FORMAT, FDISK, DELETE, DELTREE or other DOS commands which may mistakenly overwrite or eradicate important data files belonging to another user.

My inventions's absolute protection affords each user of the computer with a distinctive hardware based independent mass storage medium which under no circumstance can be accessed by an unauthorized user through frenzied recovery attempts installations of defective software, virus corruption, or mere "nosing about" in another user's files, or other improper file handling procedures.

A result of this hardware based disjunction of mass files used by two or more users is a level of absolute security of data integrity which heretofore was found only through usage of entirely separate user-dedicated computer systems.

ECONOMIC IMPORTANCE

Loss of data when the information stored by the data includes client files, sales leads, technical information or a variety of other unique data can introduce substantial economic loss to a small business, as typified by a home office environment. Sometimes the information is impossible to reconstruct after a loss caused by hard disk corruption. At the very least, the information is likely to be very laborious and time consuming to re-enter. It is possible that this unexpected loss of critical information can actually push a small business over-the-edge into financial insolvency or bankruptcy.

In order to achieve a level of safety and freedom from concern regarding cross-operator data corruption now afforded by my invention, it is heretofore necessary to procure and maintain two distinctly separate computer systems. A computer's cost is substantial if it affords state-of-art performance levels demanded by most better contemporary software. Applications software utilize a lot of storage space and more importantly, they require huge RAM memories and high microprocessor speeds in order to operate with the snap and quickness which is expected if not demanded by most users. Games are frequently even more demanding of computer hardware performance, by virtue of the processing needs for good video animation and realistic game plays.

The result of these aforesaid hardware requirements, when to two separate computer systems, can result in considerable overkill in the sense of hardware investment. For example, two separate 200-MHz Pentium micoprocessor based IBM-AT computer systems having 32-megabyte RAM, 8X CD-ROM, VIVO Sound Card, 33.6-Kbs faxmodem, 17" SVGA monitor and 3.6-GB hard disk drive which appears as current art (PC magazine, Feb. 4, 1997, pp 129) as embodied in a model P55C-200FPC offered by Gateway-2000, Inc., N-Sioux City, S. Dak. 57049-2000 to sell for about $2,918 each. This makes for a total investment of at least $5,836 for two separate systems to obtain autonomous operation by two users.

Using only one mentioned $2,918 computer and installing an additional separate hard disk drive can accomplish virtually the same level of autonomous operation for the mere additional cost of $350 for an extra 36-GB (Quantum) hard disk drive plus about $75 for an interface card suitable for supporting my invention This combination secures true autonomous operation for two users on a single Gateway-2000 computer for about $3,343 compared with $5,836 for two separate equivalent systems. This represents a saving of $2,493 to the users (e.g., about 43% cost saving).

SUMMARY

A central purpose of my invention is to virtually eliminate computer system crashes which may come about due to another non-concurrent computer user's sharing of the computers resources. This is to say that what is eliminated is the likelihood for a computer crash wherein the cause may be traced to accidental corruption of the computer's mass memory storage device, commonly implemented as a hard disk drive. Computers which share the same hard disk drive between two or more disparate and non-concurrent users are especially vulnerable to unexpected crashes, loss of data and operational error. This comes about mostly due to the "other" user's installation of new or additional software, inexperience in using system level utility programs and plain ordinary operator errors. Sometimes an occurrence of malicious file violation by another user is the cause for data loss or program crash.

Of course a computer system crash may come about from a variety of other causes. The most aggravating situation to occur is when the computer is shared by two or more non-concurrent users having widely disparate operational requirements. Such shared conditions may be illustrated to include the use of the computer's resources by one user for business purposes, while the other user later uses the same computer resources to play games.

When a computer crashes, a software defect is most often the culprit. In one form, the software defect might be intrinsic in the applications program, or it might involve a random error produced in the computer's hardware (such as a defective memory bit location) or through user error. More problematic is the introduction of file or program errors in the mass memory storage through mistake or tampering by another system sharing user. This later type of cross-user introduced file corruption might be caused through installation of new software by another user, or through the other users ignorance in using system level program commands.

A virus may also be inadvertently introduced into a system by one user which may destroy the efforts of another user. While anti-virus software can serve to reduce the liklihood for this sort of damage, the vulnerability of one user to another user's installation of contaminated software remains as a real and potentially catastrophic problem associated with system sharing.

It has long been realized that no alternate-user induced computer crash can necessarily occur when each category of user has his own separate and operationally isolated computer system. When one computer is used for office purposes, while another separate computer is setup to play games there is no common vehicle for introducing file or program error in one of the computers by mere operation of the other computer. Files and programs on each machine remain pristine relative to any machine in usage which may occur on the other separately maintained machine.

Reality is such that such duplicity of resources is extraordinarily wasteful of resources and more to the point unnecessarily costly. Non-concurrent users share only one portion of a computer system which may be corrupted by the other user. That portion is the hard disk drive itself. All other portions of a computer are benign relative with the operating sessions of non-concurrent users. For example, the video display, microprocessor, RAM, keyboard and most other portions of the computer are shut-down and re-initialized during boot to establish a "clean state" operating environment. All, that is, except the mass memory storage device, e.g. the hard disk drive.

It is common practice for a hard disk drive to be partitioned into several portions, with each portion assigned to a different user or operator. Unfortunately, no matter how well intentioned such partitioning is, it does not truly isolate the users catastrophic data loss. In such an arrangement, the underlying operating system as MS-DOS, Windows, Unix or OS/2 is shared in common by each of the non-concurrent users. While several different operating systems might be installed on the same system, for example Windows 95 and Windows NT4.0 may be used on the same system with the operating system determination being made during boot, what remain is that whatever operating system is selected, it is not uniquely isolated to only one user. It can also be accessed, or at least corrupted, by actions of the other user. Sometimes this corruption might come about because one user or the other inadvertently or intentionally runs a utility function such as FORMAT and simply causes a reformat of the hard disk to occur which inevitably results in massive and irreversible hard disk data loss.

Since the only necessarily shared portion of the computer which is irreparably vulnerable is the hard disk drive and the software which it holds, what my invention accomplishes is to utilize two or more physically distinct and electrically disassociated hard disk drives each of which is independently operable only by an intended user. No action by the other non-intended user can access the unique hard disk drive and as a result, even massive errors such as a disk re-format can not occur on another user's operationally set-aside hard disk drive through the dumb or intentional efforts of the immediate user.

Each of the several separate hard disk drives may typically hold similar operating system software, together with the unique application programs demanded by the assigned user. As a result where two separate hard disk drives are utilized to service two different users, each hard disk drive is loaded with its own operating system (such as MS-DOS, Windows, OS/2, etc) and the operating system on each hard disk drive may be nearly identical, or entirely different.

When an user accesses the computer system to utilize it for his own purpose, he also accesses his alone designated hard disk drive. Any other hard disk drive is operationally set-aside and secured against access through password protection during boot, by a unique removable media device (e.g, a floppy disk, etc.) or through hardware selection devices such as a keyswitch or user-ID data card.

OBJECTIVES

An object of my invention is to isolate a non-concurrent user of a computer system from data corruption of program and data files caused by another user's actions.

A primary intent for my invention is to obtain a virtual level of isolation and operative security for two or more users when using a common set of computer hardware resources as what heretofore has been obtained through providing each user with a fully separate computer hardware system.

A further object of my invention is to allow adaptation of a computer's hardware resources to support two or more fully independent and separately operable hard disk drives which may serve the software needs of non-concurrent uses without a liklihood for corruption of a previous user's programs and files by an instant user's activities on the shared computer hardware resources.

It is a still further object of my invention that an immediate user of a computer's hardware resources may not corrupt hard disk files of another, including reformatting, re-initialization and deletion efforts attempted through any action entered via a keyboard, mouse or peripheral device interface port.

Yet another object of my invention is to provide each user of a computer's hardware resources with an unique and operationally independent hard disk drive subsystem portion of several hard disk drive subsystems which may be included with the hardware resources and which may be solely operable by the assigned user and absolutely isolated from access by any other user.

Still another goal for my invention is to utilize several hard disk drives of ordinary construction, together with an addressable ATA or equivalent host adapter which may cooperate to uniquely assign absolutely independent operation of each of the several hard disk drives to a distinct users.

Another object of my invention is to fully isolate and absolutely prevent mass storage media corruption of non-compatible operating systems such as Windows-NT and Unix which might be non-concurrently utilized on the same set of computer hardware resources. My invention serves to enable computational hardware resource sharing without concern for corruption of one operating system's program or data files by commands entered the other operating system. For example, this is to prevent a FORMAT command inadvertently (or intentionally) entered into a Windows-NT mode operation from erasing a system sharing Unix operating system.

A still further object of my invention is to unconditionally isolate and maintain personalized setup (such as the .INT, .DAT and .DLL files) to thereby able non-conflicting utilization of similar operating systems such as Windows-95 and Windows-NT/4.0 which might be non-concurrently utilized on the same set of computer hardware resources, even when the same person is a virtual non-concurrent user of each operating system. My invention serves to enable sharing of substantial portions of a computer system's hardware investment between two or more sets of independently configured software without concern for corruption of one operating system's program or data files by setup procedures, installation files or other activities entered into the other operating system.

A key intent of my invention is to provide each of several uses of a computer system with individually assigned storage mediums which afford nearly the same level of security as that which is inherent with fully removable mass storage media while retaining the convenience, reduced cost per megabyte of storage, and inherent physical protection against damage associated with internal hard disk drive apparatus.

Still another object for my invention is to enable each nonconcurrent user to obtain unique CMOS memory location, thereby providing special personality definition for each user through utilization of separate CMOS stored setup instruction the detail of which may be specified differently by each user.

DESCRIPTION OF MY DRAWINGS

My invention is depicted on 19 sheets of drawings including 20 illustrative figures.

FIG. 1—Arrangement of personal computer including operator selectable hard disk drive exclusion.

Figure 2:
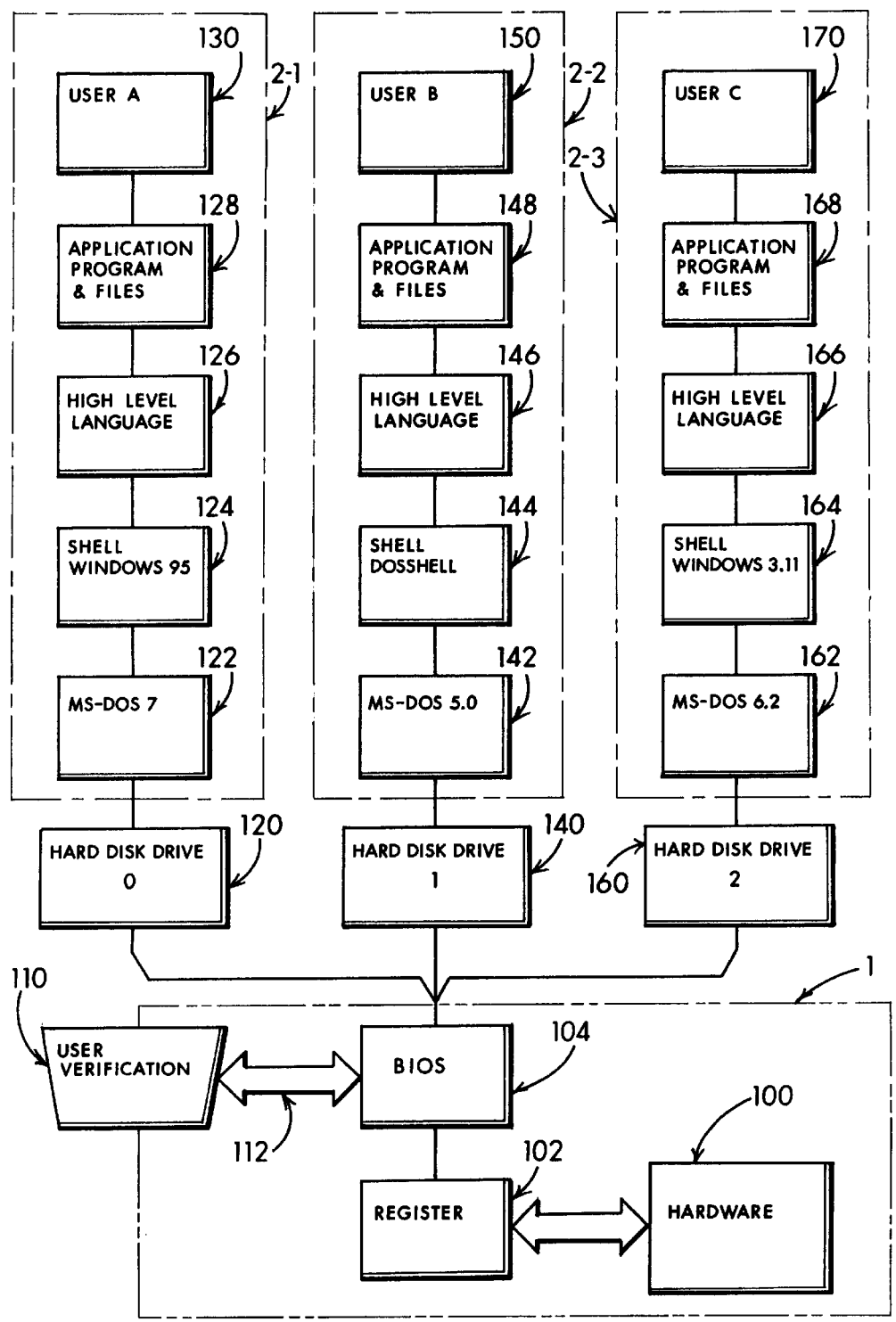

FIG. 2—Depiction of several entirely separate operating system and program software groups exclusively tied tied to separately selectable users.

Figure 3:
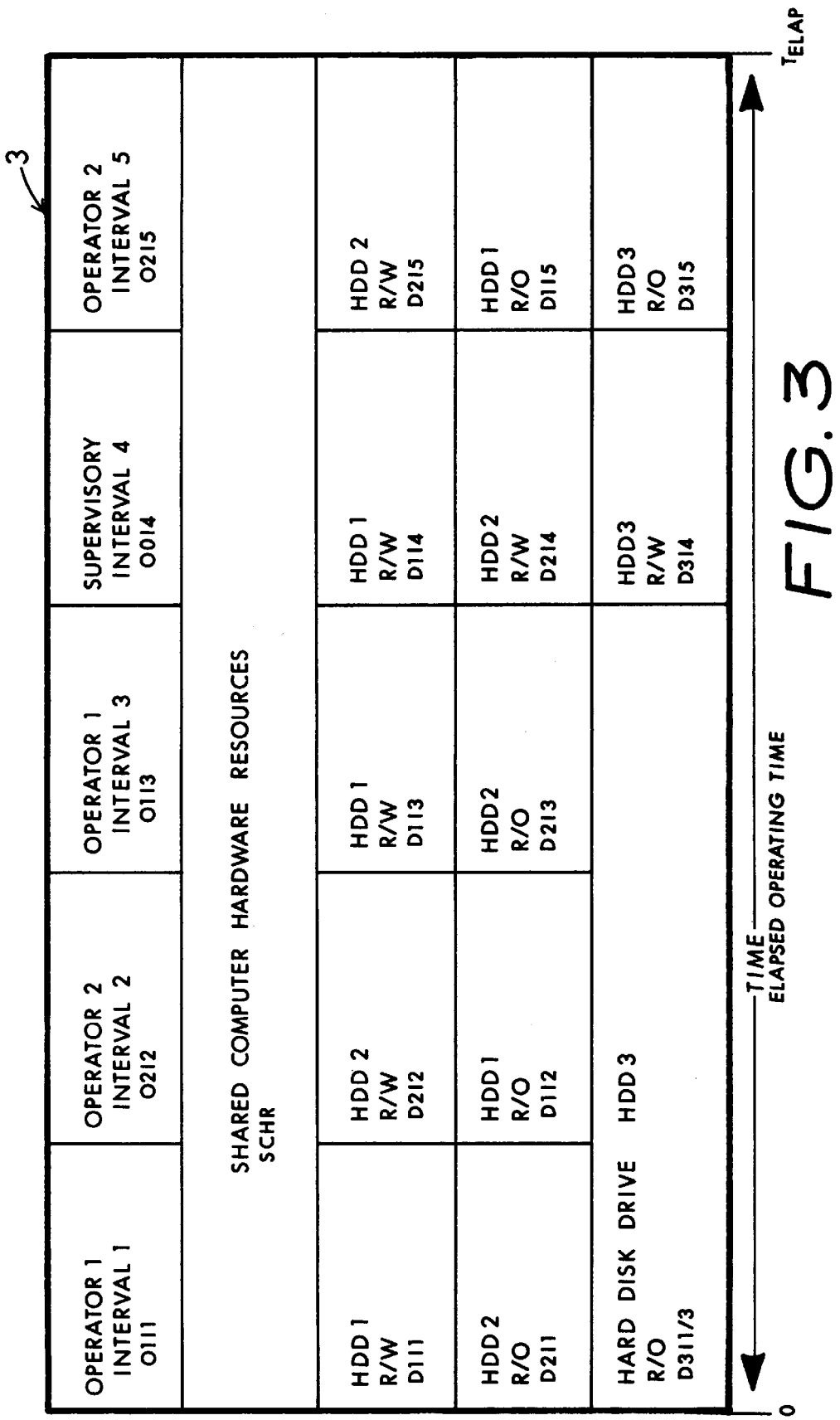

FIG. 3—Depiction of exclusive user dependent time interval software access with sharing of computer hardware.

Figure 4:
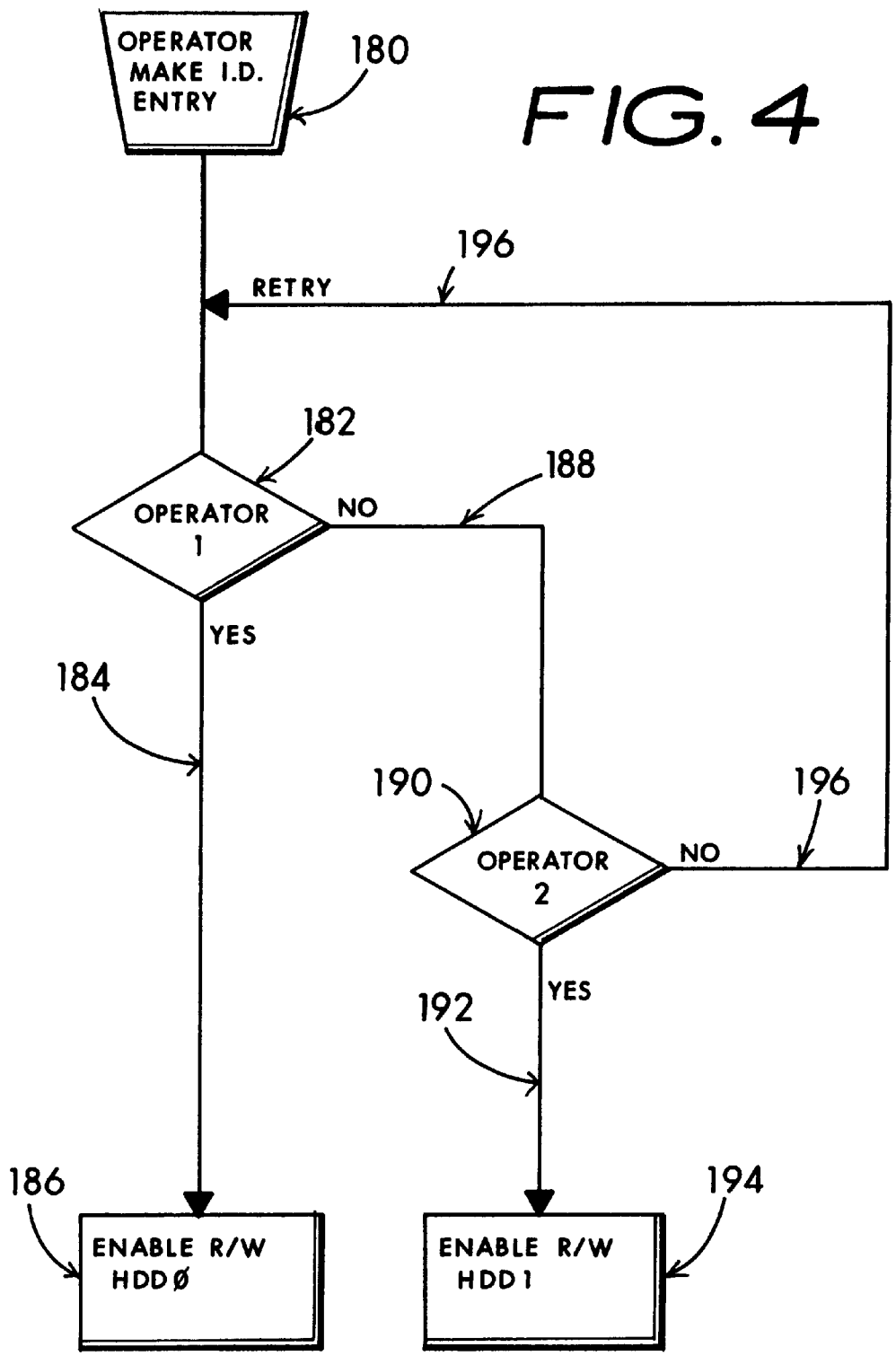

FIG. 4—Flowchart showing exclusive operator selection of separate hard disk drives.

Figure 5:
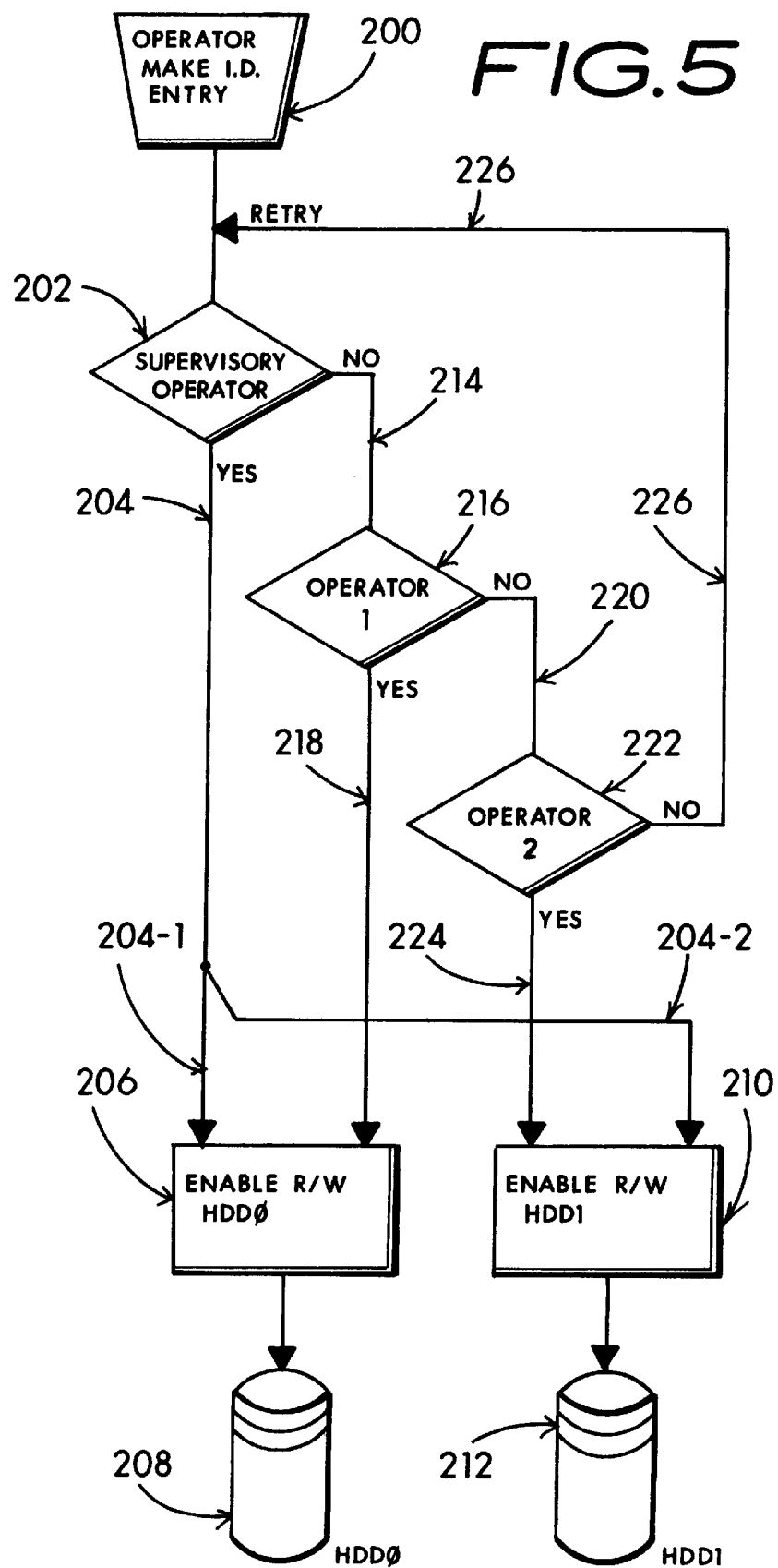

FIG. 5—Flowchart showing inclusion of supervisory operator enabling operability of every hard drive while maintaining users exclusion operator access denial to hard drives unauthorized.

Figure 6:
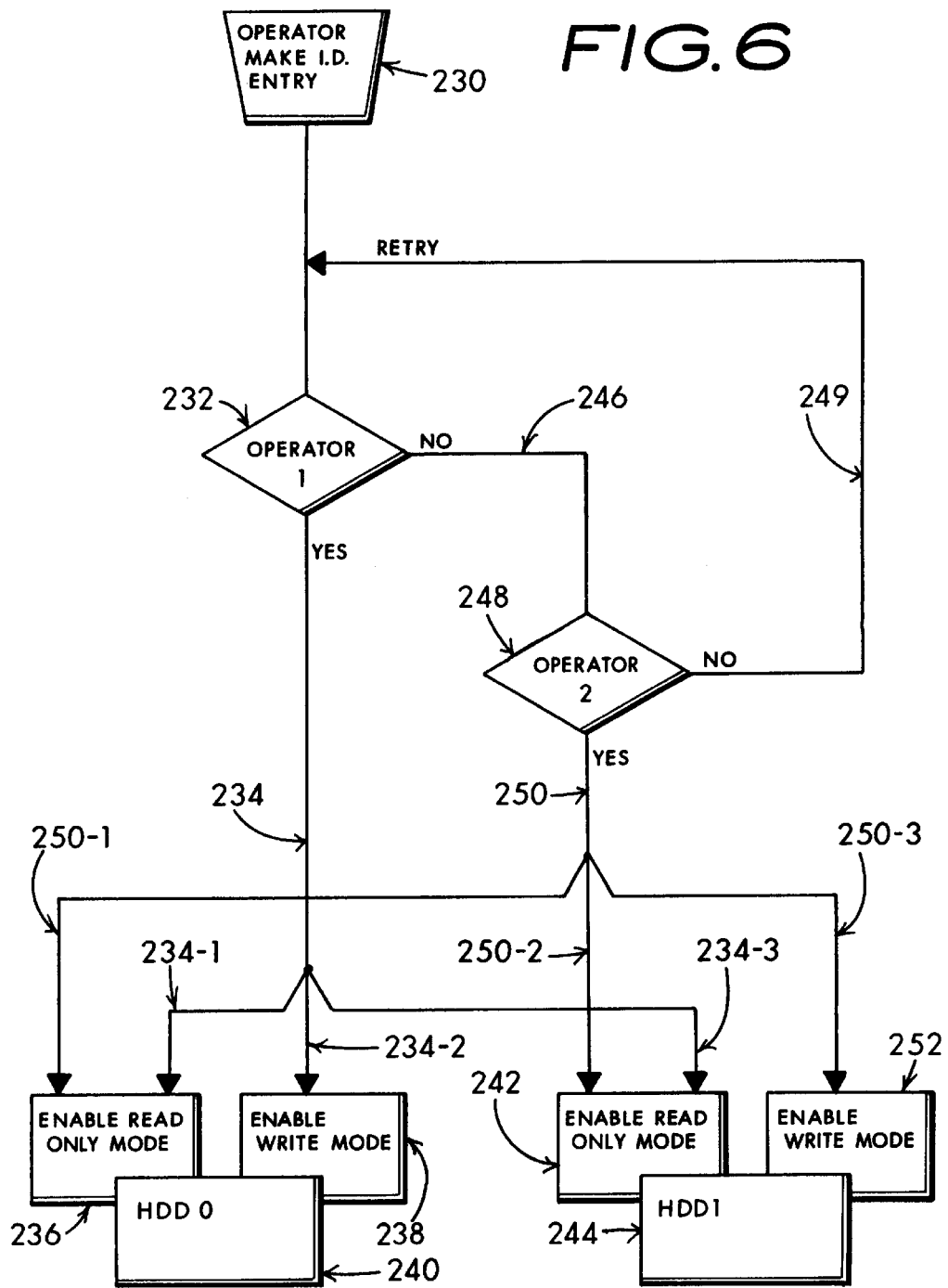

FIG. 6—Flowchart showing full first operator read and write access to a first hard disk drive and read only limited access to a second hard disk drive and further showing full second operator read and write access to the second hard disk drive and denied access to the first hard disk drive.

Figure 7:
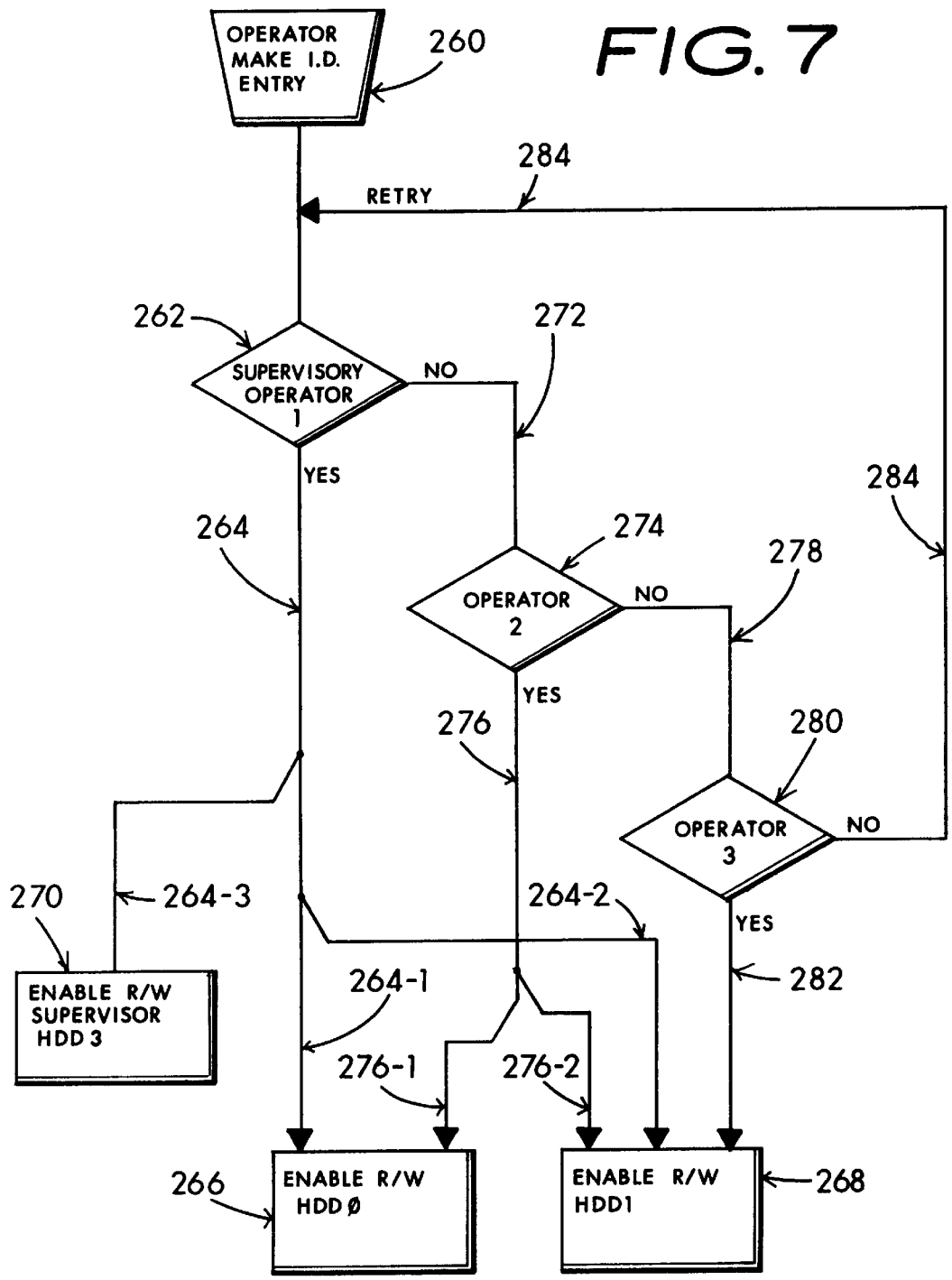

FIG. 7—Flowchart showing a supervisory operator having full access to every hard disk drive including a supervisory hard disk drive; a second operator full read and write access to each non-supervisory hard disk drive; and limiting a third operator a full access to a single hard disk drive.

Figure 8:
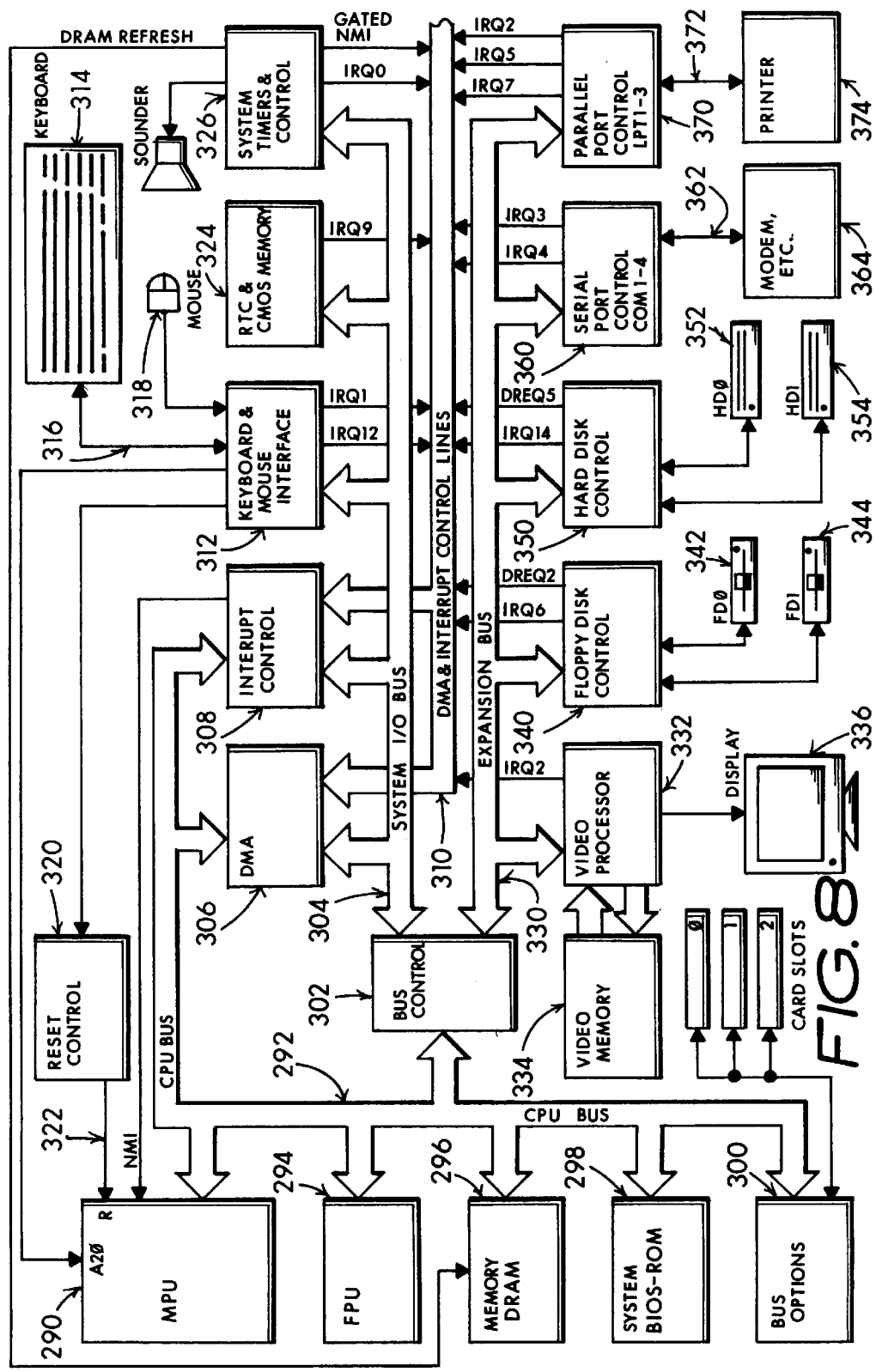

FIG. 8—Illustrative block diagram of intended shared hardware resources of my invention.

Figure 9:
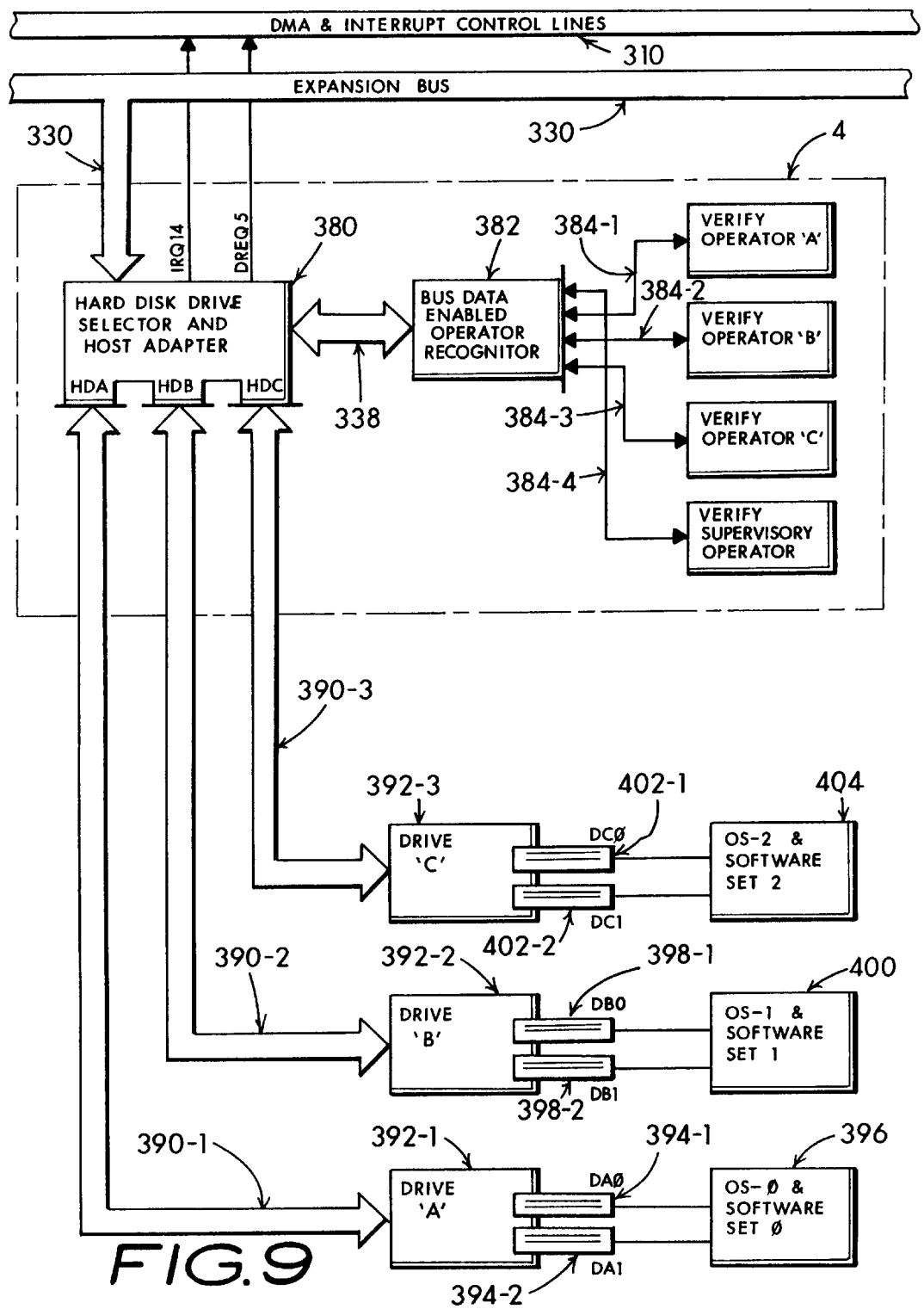

FIG. 9—Block diagram extension of FIG. 8 showing shared hardware resources coupled with an operator relatable hard disk drive selector and recognitor enabling verifiable exclusive election of separate user related hard disk drives.

Figure 10:
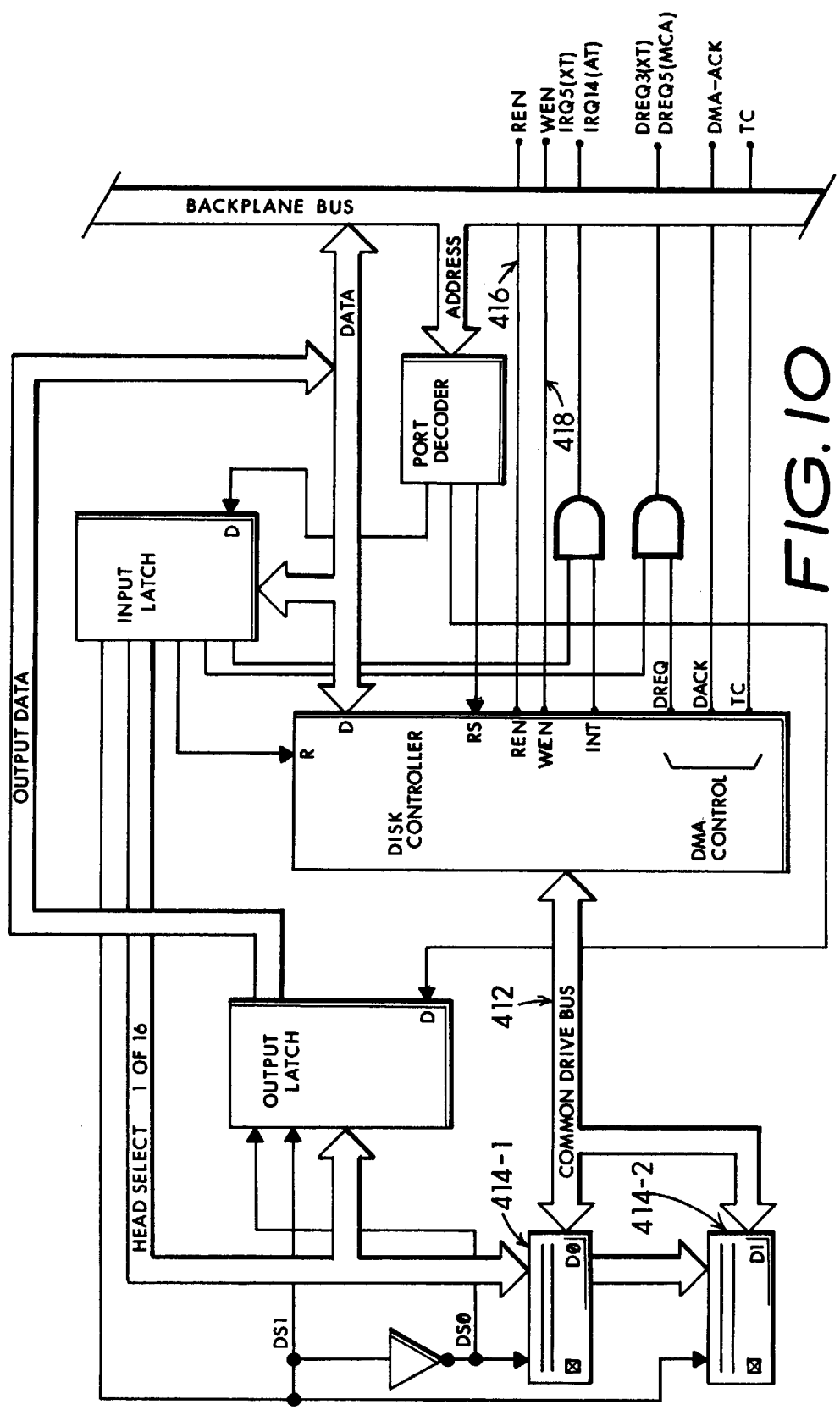

FIG. 10—Block diagram extension of FIG. 8 showing a hard disk drive controller which may be relationally selected by a verified operator.

Figure 11:
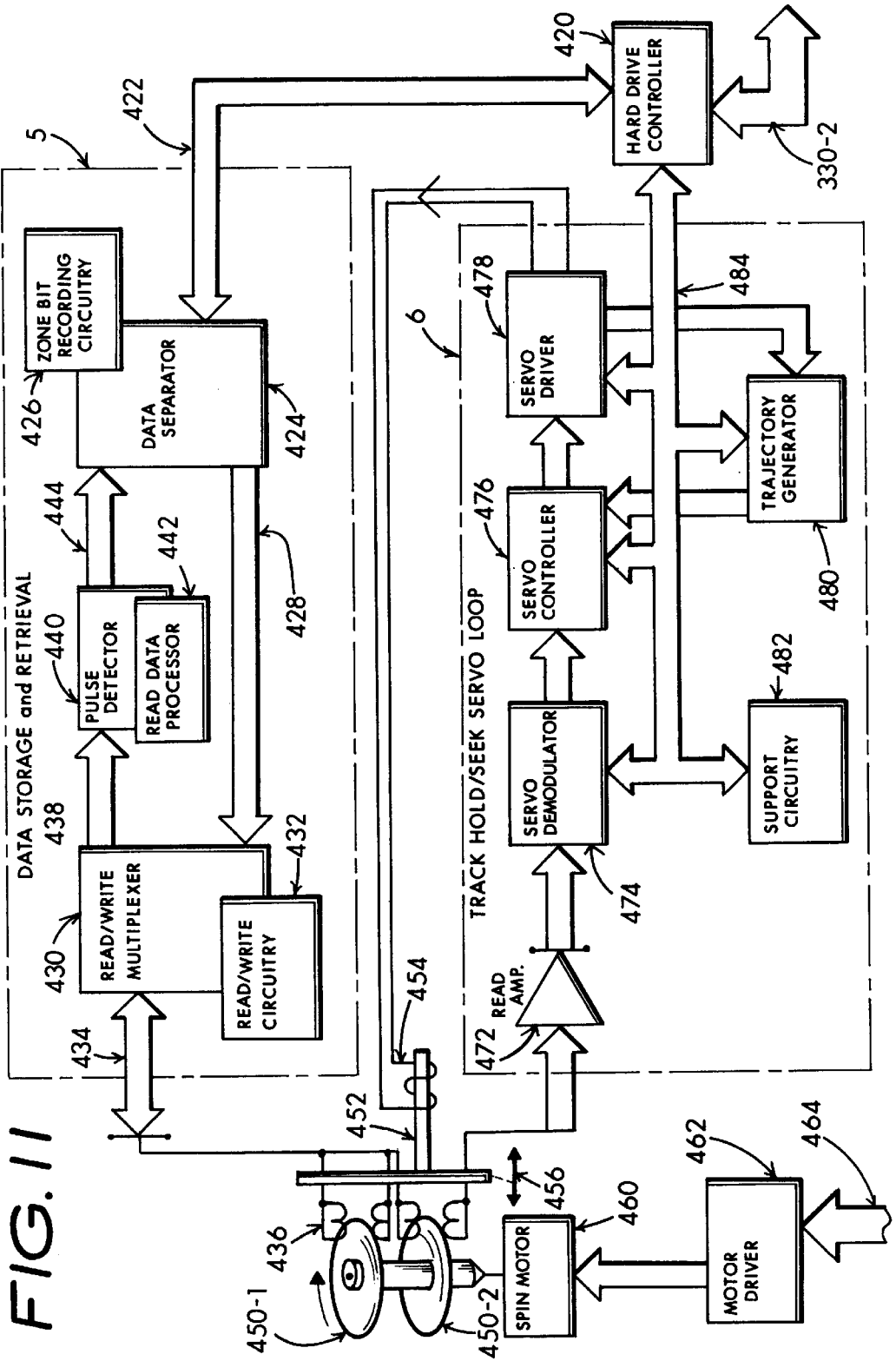

FIG. 11—Block diagram extension showing a prior art form of hard disk drive controller.

Figure 12:
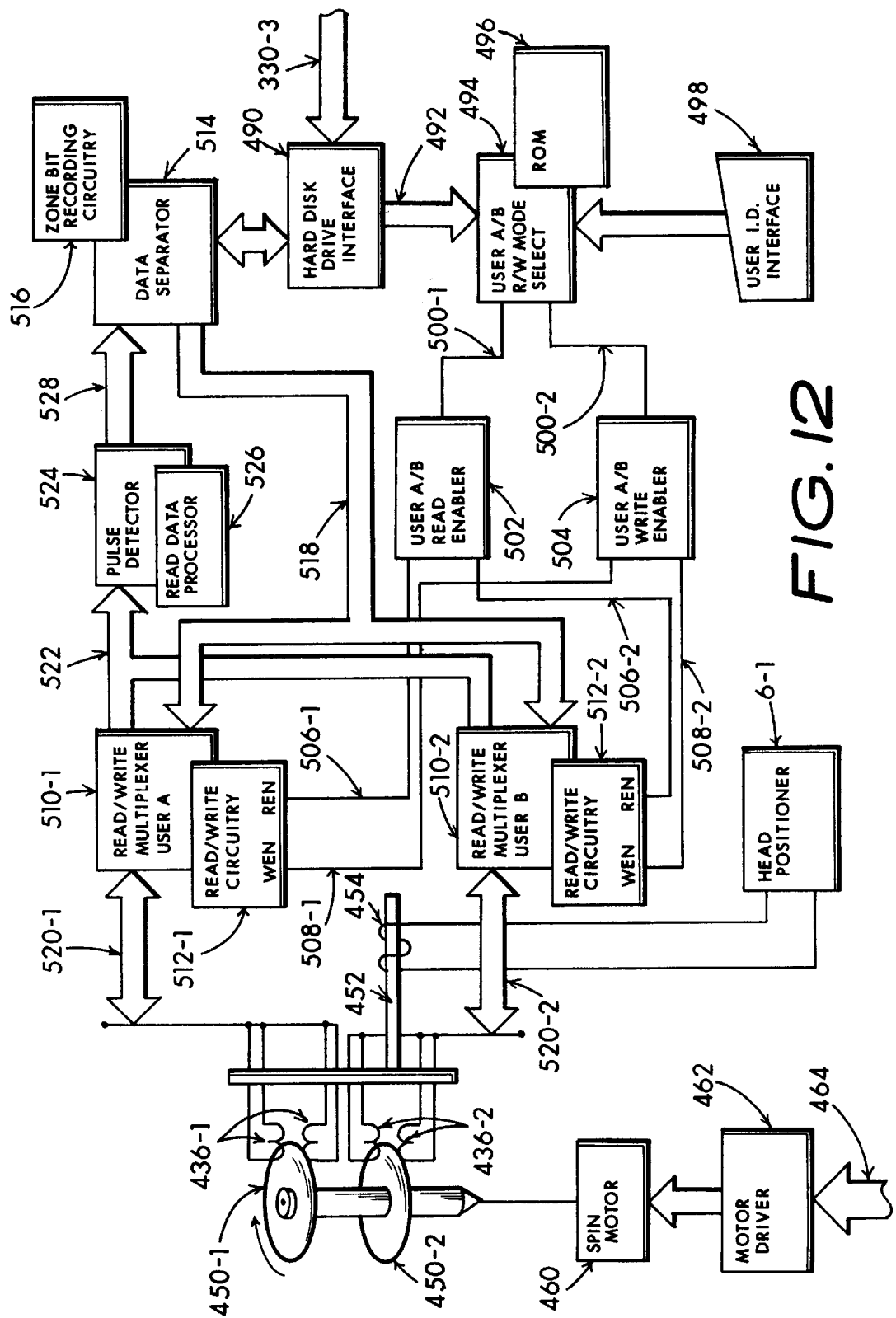

FIG. 12—Block diagram extension of FIG. 11 showing the hard disk drive controller including exclusive user related enablement of disk platters as nonshared storage media.

Figure 13:
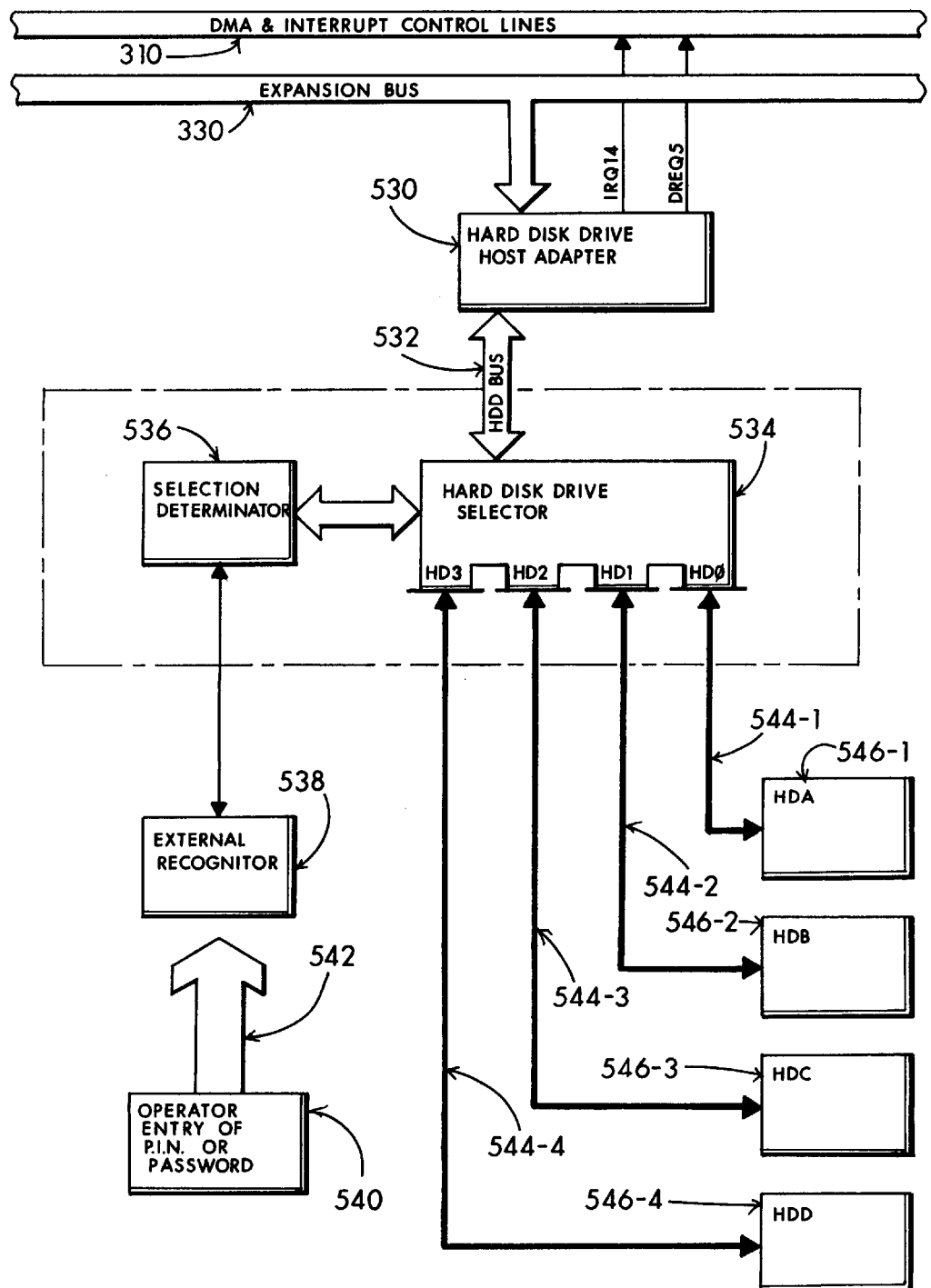

FIG. 13—Block diagram extension of FIG. 8 showing external recognitor for accepting a PIN or password verification of a user relative with at least one of several selectable hard disk drive.

Figure 14:
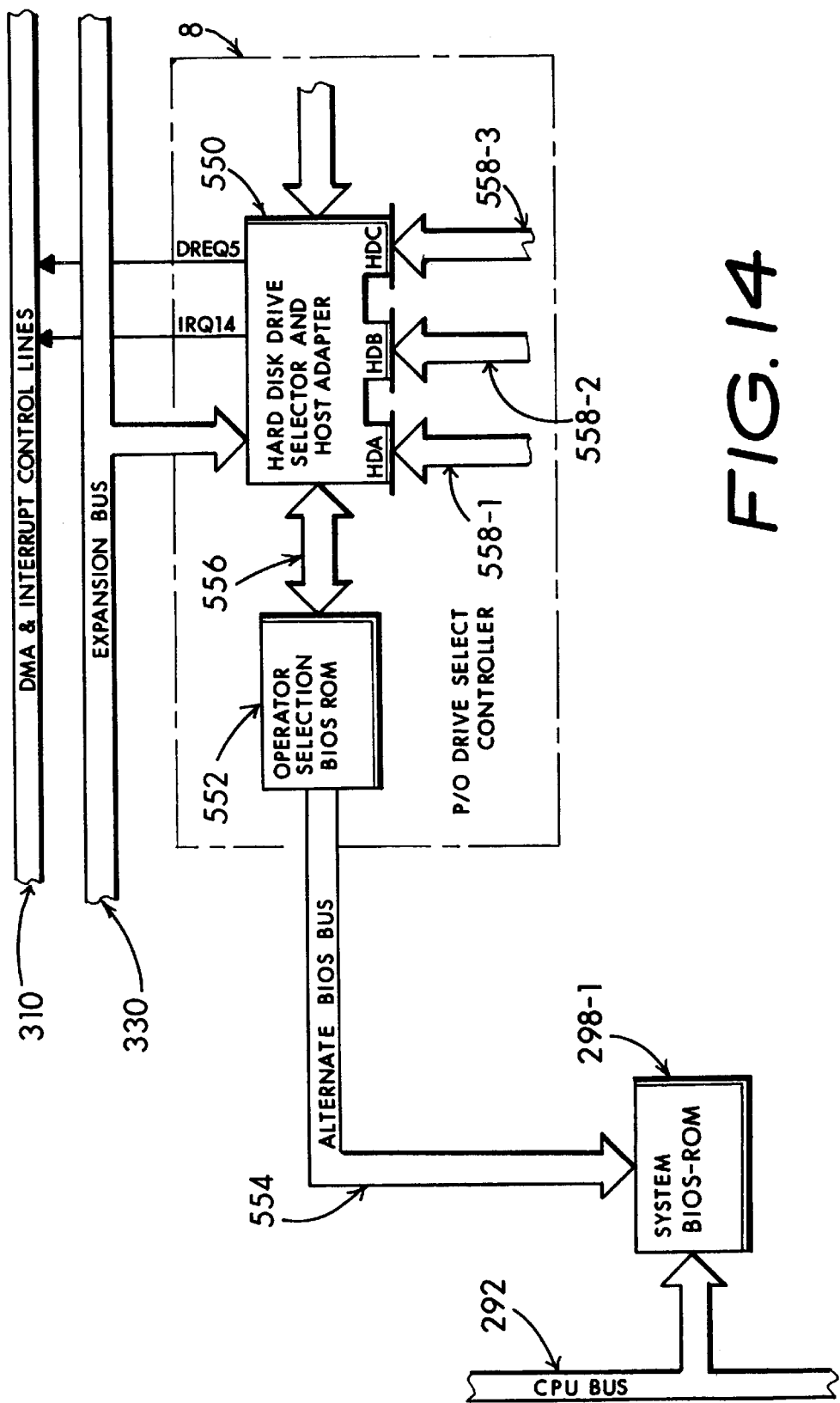

FIG. 14—Block diagram extension of FIG. 8 showing BIOS-ROM extension by an ancillary operator selection BIOS-ROM.

Figure 15:
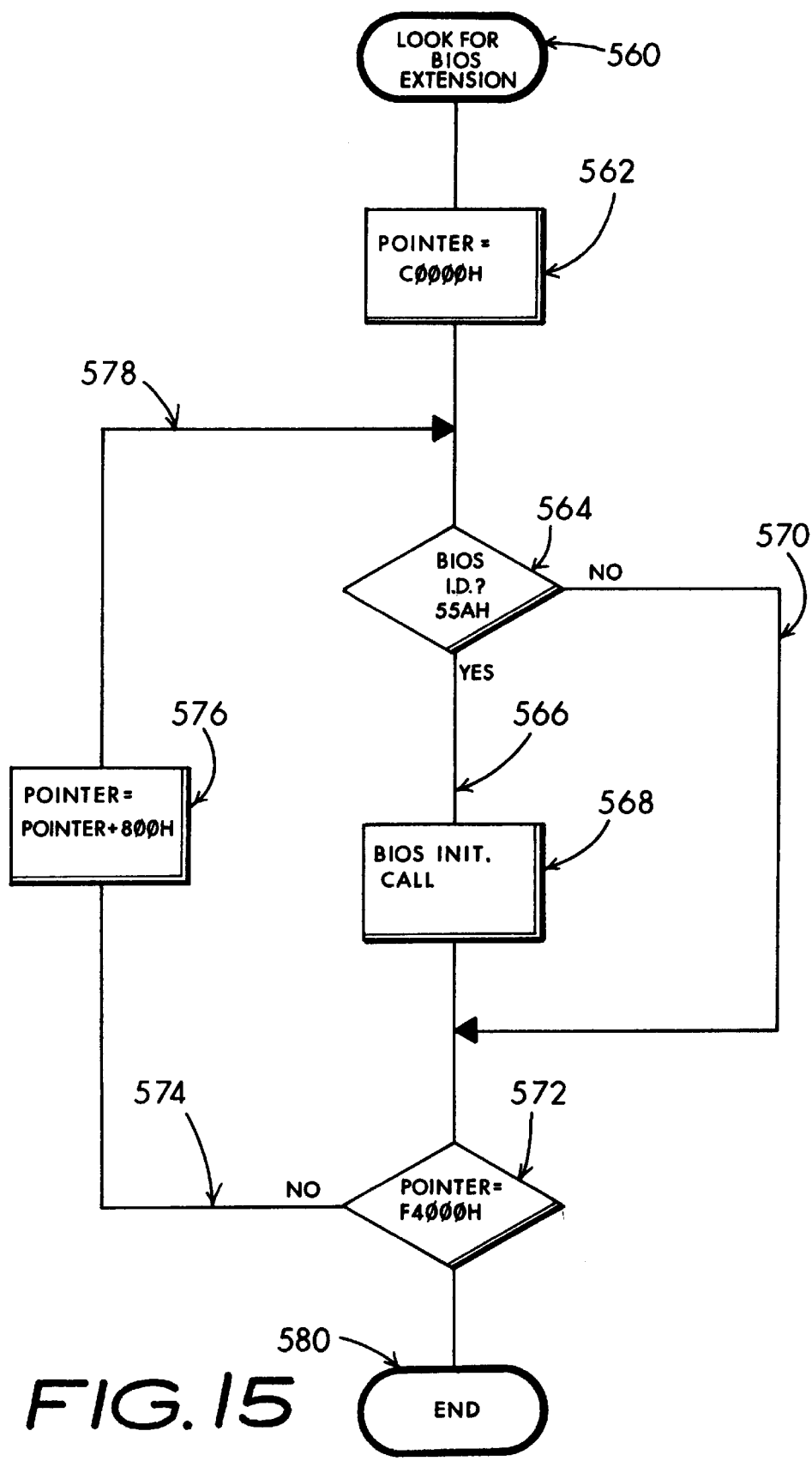

FIG. 15—Flowchart showing software inclusion of operator selection BIOS-ROM extension.

Figure 16:
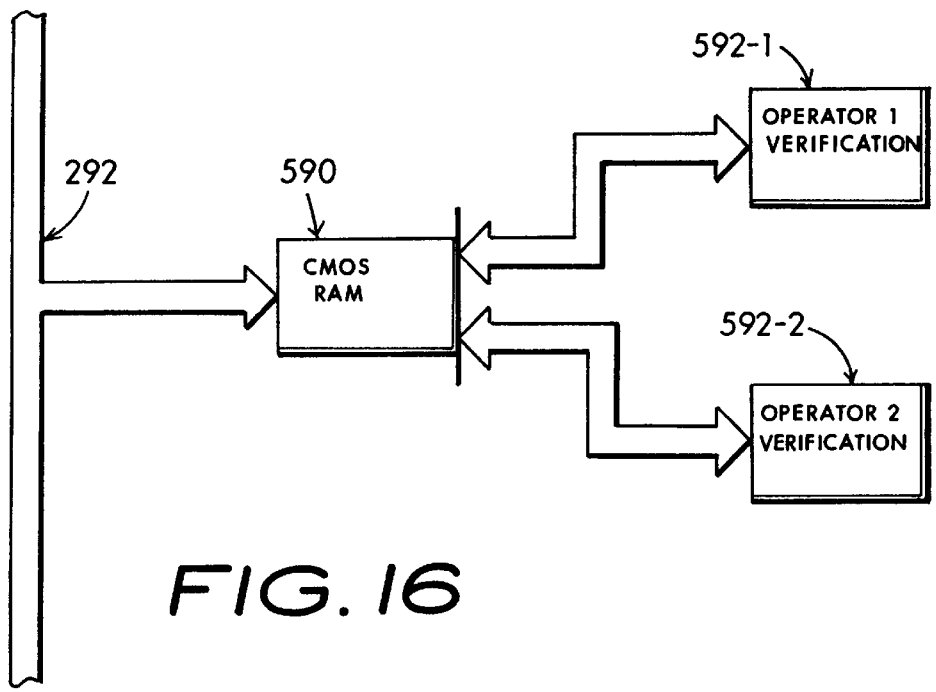

FIG. 16—Operator verification data utilized to modify CMOS RAM to acheive unique user relatable hard disk drive enablement.

Figure 17:
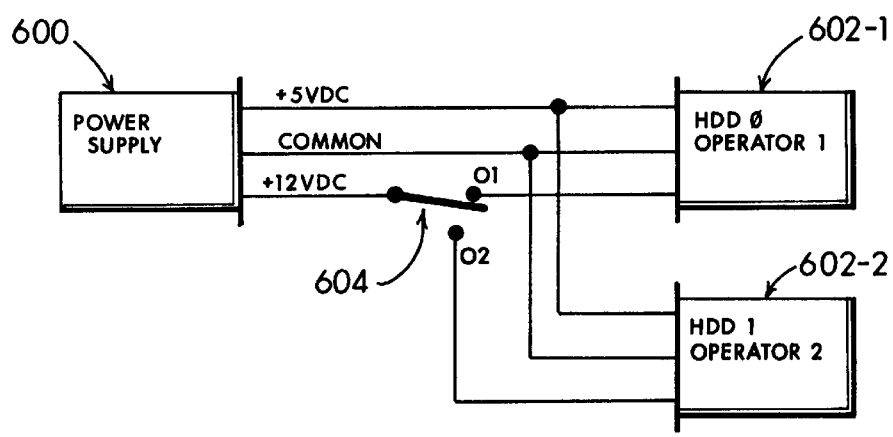

FIG. 17—User relatable cutoff of unauthorized disk drive DC power to absolutely disable unauthorized hard disk drive operation and thereby inhibit corruption of another user's operating system or program software.

Figure 18:
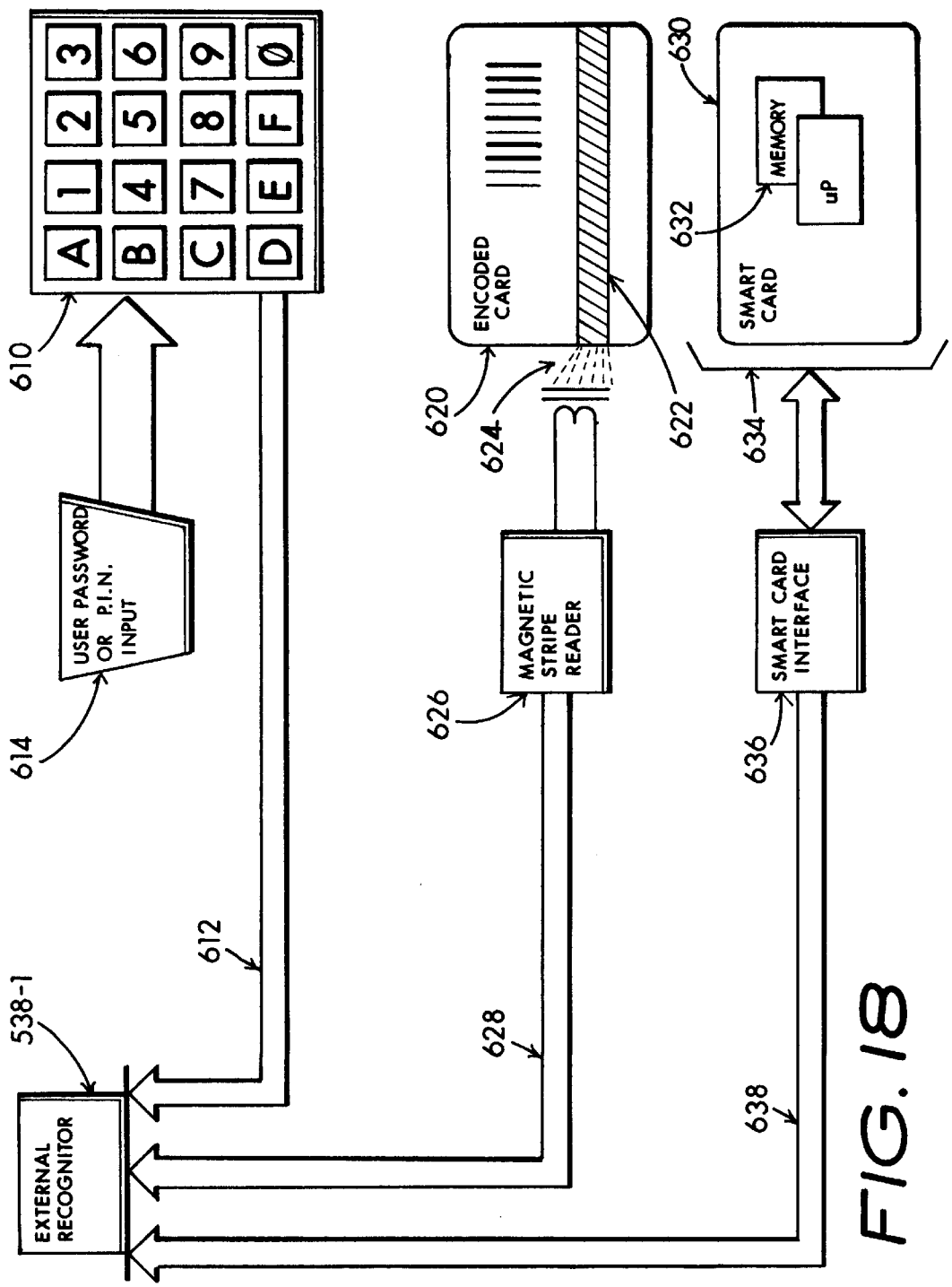

FIG. 18—Block diagram extension of FIG. 8 showing inclusion of a keypad PIN entry device, a magnetic encoded card and a "smart" card device for user verification.

Figure 19:
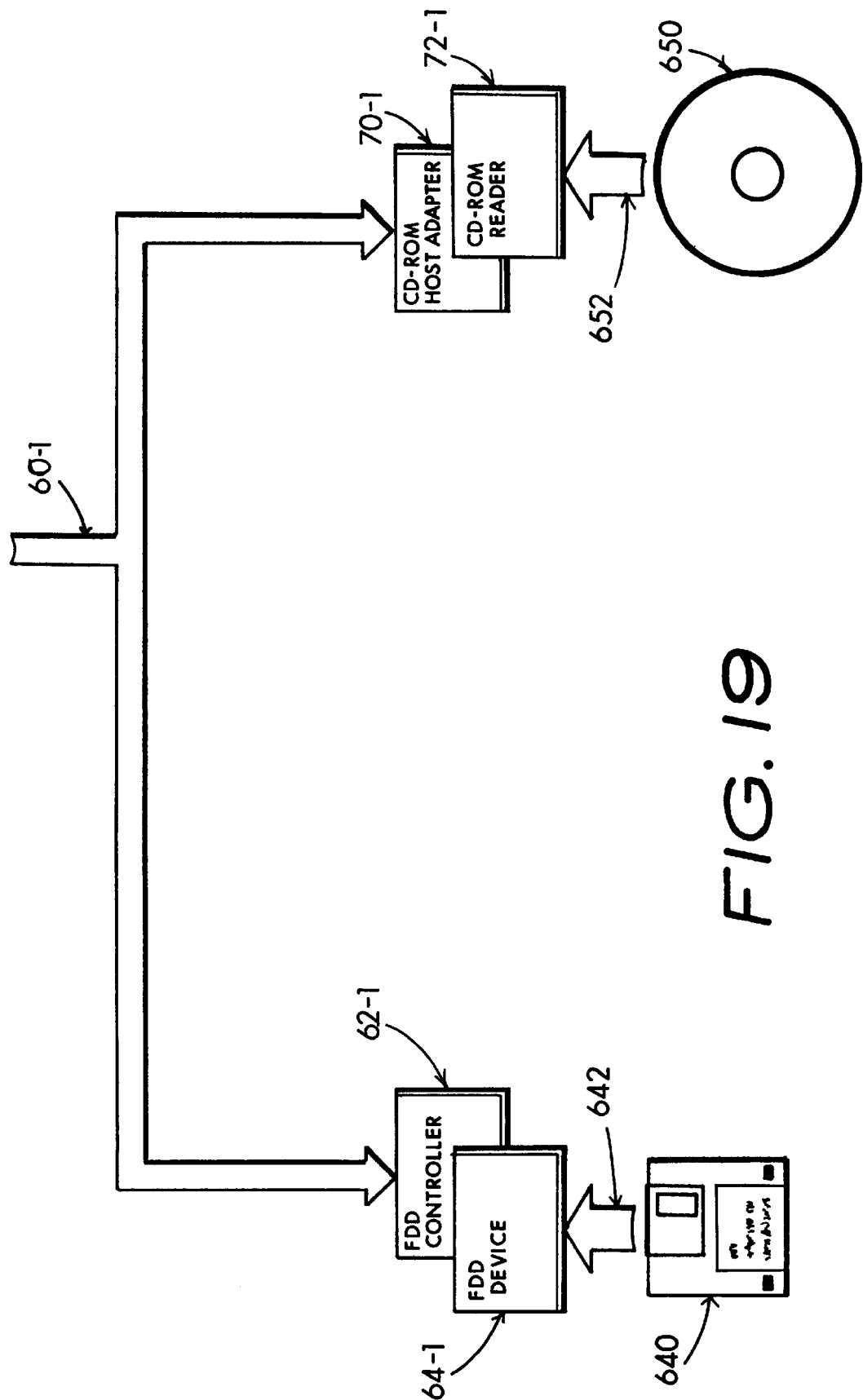

FIG. 19—Block diagram extension of FIG. 8 showing inclusion of a floppy disk and CD-ROM for user verification.

Figure 20:
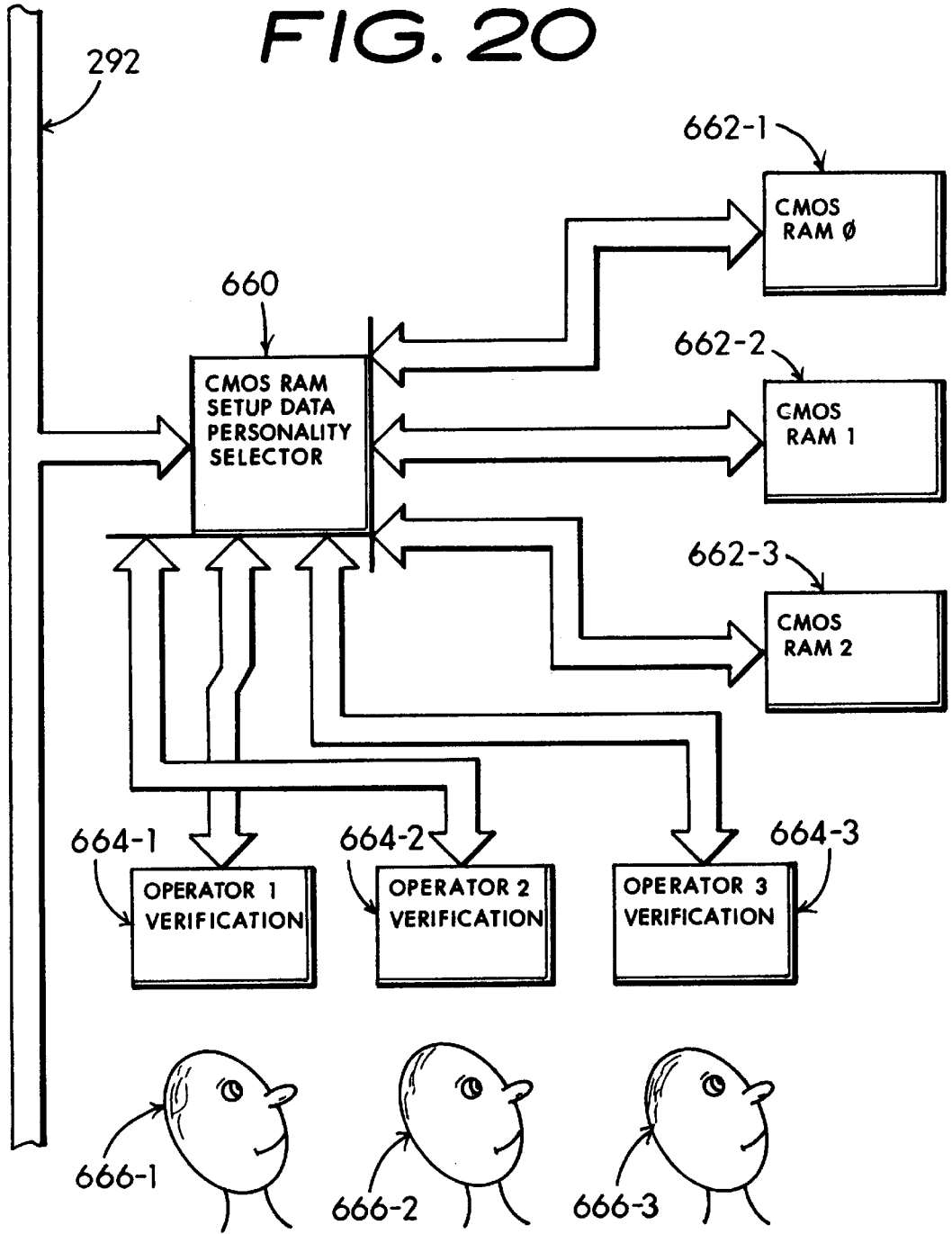

FIG. 20—Block diagram extension of FIG. 16 showing unique selection of CMOS setup personality for the computer relative with each of several users.

DESCRIPTION OF MY INVENTION

A typical personal computer (herainafter PC) configurative layout appears in a block diagram shown in FIG. 1. A microprocessor 10 (typically an Intel 80486, Pentium or MMX or equivalent device) is shown to include a math coprocessor 12. A keyboard interface 20 is coupled via line 22 with a keyboard 24 to provide convenient user interface. A video display adapter 30 obtains microprocessor data signals on bus 32 and develops video signals on lines 34 which produce a display on a monitor 36. A video BIOS-ROM device 38 is ususally include as a portion of the video display adapter. Ordinarily, the video BIOS-ROM is addressed during POST (power on self test), with the VBIOS (video BIOS) usually sited at location C000:000 in memory.

A data BUS 40 further couples the microprocessor 10 with the system's DRAM (dynamic random access memory) which, in contemporary systems, is usually in excess of 16-megabytes. The system BIOS-ROM which contains the POST routines and a horde of other initialization and I/O data appears as a PROM 44. Additionally, a RTC (real time clock) and CMOS memory device 46 serves as a system clock and a store for SETUP data.

Output data coupling is accomplished by utilizing a BUS 50 to couple the microprocessor data lines with a parallel interface adapter 52 and a serial interface adapter 54. The parallel interface 52 is commonly dubbed as a Centronics interface and in modern computers, it is designed to operate in a bi-directional mode which is an extension of the original and more limited unidirectional Centronics specifications. Portal connections with the parallel interface is commonly obtained utilizing a 25-pin or 37-pin connection, with the available ports commonly known as LPT1, LPT2 and LPT3 in the conventional PC. The serial interface 54 delivers up to four RS232C specification serial port connections, commonly known as COM1, COM2, COM3 and COM4. Connection is usually via a 25-pin or, more recently, a 9-pin connector.

Another BUS connection 60 intercouples microprocessor signal data with a floppy disk drive controller 62. Usually, the FDD controller 62 hosts two floppy disk drives, e.g. DRIVE A and DRIVE B. Common practice may make the FDD 0 device 64 the DRIVE A, typically embodied as a 3.5", 1.44 MB floppy drive. Similarly, the FDD 1 device 66 becomes the DRIVE B sometimes embodied as a 5.25", 1.2 MB drive, if not as a second 3.5", 1.44 MB drive.

The BUS 60 further intercouples with a CD-ROM host adapter 70. Usually the host adaper is an IDE or SCSI design which supports a CD-ROM device 72 to enable at least reading-of CD-ROM disks.

Up to this point, all the components which make up the PC are intended to be shared with any user who may venture to utilized the PC for computational purposes involving data base management, word processing, software development or whatever. This brings us to the portion of the PC which is unique in my invention, enabling shared operation of these preceding resources by more than one user while maintaining absolute separation of operating system, program and general software data storage for each user. The fundamental intent is to absolutely prevent corruption of one user's data storage by another user's innocent or malicious misuse of the shared portions of the system.

Observe that BUS 60 couples with a hard disk drive host adapter 80, which includes a hard drive BIOS-ROM 82. In principal the host adapter 80 operates in a conventional manner, producing hard drive signals on BUS 84. It is at this point where my invention's novelty is introduced to absolutely separate several distinct user storage facilities. A hard disk drive sector 86 is coupled with an operator (viz, USER) verification function In other words, the operator or user makes an identification entry 88. If the user properly identifies himself as USER 1, for example, the HDD selector 86 provides signals on BUS 92 which enables a HDD 0 device 90-1. At the same time, the other HDD 1 device 90-2 is absolutely denied unauthorized access and possible data corruption by the USER 1. If the use instead properly identifies himself as USER 2, the HDD selector 86 provides on BUS 92 which enables the HDD 1 device 90-2. At this time, the other HDD 0 device 90-1 is instead absolutely denied unauthorized access and possible data corruption by the USER 2.

A look at FIG. 2 provides specific illustration of an essential object for my invention. The computer system's hardware 100 is shared by all potential users. This notably includes the microprocessor, memory and user interface components, as earliers said for FIG. 1. The hardware couples through a register 102 which enabling a POST (power on self test) routine that advances the BIOS through its operative steps. In my invention, the BIOS may be preferably modified or extended to include a user verification provision 110 coupled 112 with the BIOS. A potential USER enters his credentials and the BIOS ordinarily elects but one of the three available hard disk drives 120,140,160.

In event a USER A makes entry through the user credential verification 110 and the HDD0 is selected, the result is exclusive access to the software contents 2-1 associated with the HARD DISK DRIVE 0 by USER A. This includes the MS-DOS operating system 122, Windows-95 shell 124, a high level language such as $C^{++}$ 126 and an applications program 128, for example QUICKEN 6.0 As this shows, USER A has access to these programs. Meanwhile, the hard disk drives 140,160 are disabled and all access to them by USER A is absolutely denied.

In event a USER B instead makes entry through the user credential verification 110 and the HDD1 is selected, the result is exclusive access to the software contents 2-2 associated with the HDD1 by USER B. In the depicted example, this illustratively includes the MS-DOS 5.0 operating system 142, the DOSSHELL shell 144, a high level language 146 and an applications program 148, such as Softkey's "NUMBER MUNCHERS" (ISBN 0-7630-0310-7) "Munch on Math" game. As this shows, only USER B has access to these programs. Meanwhile, the hard disk drives 120,160 are disabled and all access to them by USER B is absolutely denied.

In event a USER C instead makes entry through the user credential verification 110 and HDD2 is selected, the result is exclusive access to the software contents 2-3 associated with the HDD2 by USER C. This includes the MS-DOS 6.2 operating system 162, WINDOWS 3.11 shell 164, a high level language 166 and an applications program 168, such as WordPerfect 6.0 word processor. As this shows, only USER C has access to these programs. Meanwhile, the hard disk drives 120,140 are functionally disabled and all access to them by USER C is absolutely denied.

An important point to be derived from FIG. 2 is that each hard disk drive HDD0, HDD1 and HDD2 is a complete operating system entity unto itself, insofar as software is concerned. This means that each hard drive normally includes a BOOT sector for system start-up, in addition to the various operating software programs. This separateness, including the BOOT sector, enables each hard drive to be operating in a fully independent mode. That is to say, HDD0 might be running Microsoft's Windows-NT, HDD1 might be running UNIX, and HDD2 might be running Digital Research DR-DOS. Such HDD operating system (OS) is absolutely independent, without dependence on the other disabled physical drives.

Nonconcurrent usage by several operators is illustrated by the chart 3 of FIG. 3. Note the elapse of time $T_{ELAP}$ which may extend for any conceivable period of time, e.g. hours, days, weeks, etc. In the first row, I show operator intervals O1I1 through O2I5, left to right. In a realistic usage for my invention, it is reasonable to assume that the times represented by each of these columns may be quite different. Furthermore, the sequential mix of operators may vary. This is normal and to be expected. Look now at column O1I1 Operator 1, Interval 1, The shared computer hardware resourses SCHR are literally shown to be shared by all operators at all times. In this column O1I1, note that hard drive HDD1 is in READ and WRITE mode for Operator 1, whilst hard drive HDD2 and HDD3 are READ only, see blocks D1I1, D2I1 and D3I1. Ultimately Operator 1 withdraws from usage and Operator 2 assumes computer operation, shown by interval 2 (block O2I2). In this mode the hard drive HDD2 is available in READ and WRITE, whilst the other hard drive HDD1 is READ only (block D1I2). The hard drive HDD3 remains READ only (block D3I2).

Next I show Operator 1 resuming control, with READ and WRITE access to HDD1, and READ only access to HDD2 and HDD3. This column O1I3 is similar to the first column O1I1.

A supervisory operator controls interval 4, column O0I4. I show that the supervisor a full READ and WRITE control over each hard drive HDD1, HDD2 and HDD3. This enables the supervisor to not only access the regular operator's hard drives, but also write data into the common hard disk drive HDD3.

As time elapses, Operator 2 may again assume control during interval 5, column O2I5. This allows READ and WRITE to HDD2 and READ only from HDD1 and HDD3.

I urge the artisan to observe that only one user class (e.g, operator or operators within that class) is allowed to operate at any given instant of time and that during the period of operation, the enabled operator is permitted access only to this hard drive files and denied at least WRITE access to any other operators files.

A flow appears in FIG. 4 which shows the most elemental implementation for my invention, that is selection between an Operator 1 and an Operator 2. The potential operator makes an identification entry 180 which might for example be a password or a PIN (personal identification number). A decision block 182 (hereinafter DBLK) accepts the entry data and attempts to match it with Operator 1 verification data. If a YES match is made, a signal on line 184 serves to enable the READ and WRITE facilities of hard drive HDD0. If the DBLK 182 does not find an entry match a NO signal on line 188 conveys the entry data to DBLK 190 which accepts the entry data and attempts to match it with Operator 2 verification data. If a YES match is made, a signal on line 192 serves to enable the READ and WRITE facilities of hard drive HDD1. If DBLK 190 does not find an entry match a NO signal on line 196 loops back as a RETRY signal, awaiting an acceptable "Operator Make ID Entry" signal to be delivered by the input source 180. As this shows, a valid Operator 1 has exclusive access to HDD0 and a valid Operator 2 has exclusive access to HDD1. Furthermore, Operator 2 and all other potential operators except Operator 1 are absolutely denied access to HDD0, whilst Operator 1 and all other potential operators except Operator 2 are absolutely denied access to HDD1. This flow chart of FIG. 4 satisfies the following TRUTH table:

|  | Hard Drive 0 | | Hard Drive 1 | |
| --- | --- | --- | --- | --- |
|  | Read | Write | Read | Write |
| Operator 1 | Y | Y | N | N |
| Operator 2 | N | N | Y | Y |

In FIG. 5 a logic flowchart depicts some variation on the preceding FIG. 4 discussion, allowing supervisory access to the hard drives HDD0 and HDD1. This accomplished whereby an "Operator Make ID Entry" signal 200 is delivered to the Supervisory Operator DBLK 202. A YES decision signal on line 204 denoting supervisor access verification couples via line 204-1 with the hard drive 206,208, and via line 204-2 with the hard drive 210,212. In other words, the supervisor has full access to both hard drives HDD0 and HDD1. A non-supervisory entry produces a NO signal on line 214 thereby delivering the entry data 200 to the input of the Operator 1 DBLK 216. If the Operator 1 is recognized, a YES signal on line 218 couples with and exclusively enables READ and WRITE access to the HDD0. Conversely, if the Operator 1 is not recognized by DBLK 216, a NO signal on line 220 conveys the input 200 data to the Operator 2 DBLK 222. A match verifying Operator 2 credentials may develop a YES signal on line 224 which enables READ and WRITE access 210,212 to the HDD1. A failure of recognition by the DBLK 202,216 or 222 results in a NO signal on line 226 which loops back to RETRY entry data when a potential operator makes another ID entry 200. Observe that, while the supervisor has a full READ and WRITE access to both HDD0 and HDD1, each Operator 1 and Operator 2 is singularly restricted to respective hard drive HDD0 for Operator 1 and hard drive HDD1 for Operator 2.

|  | Hard Drive 0 | | Hard Drive 1 | |
| --- | --- | --- | --- | --- |
|  | Read | Write | Read | Write |
| Supervisor | Y | Y | Y | Y |
| Operator 1 | Y | Y | N | N |
| Operator 2 | N | N | Y | Y |

A logic flow chart is depicted in FIG. 6 which allows not only supervisory access to the hard drives HDD0 and HDD1 but also limited READ-ONLY access by Operator 1 to HDD1 and READ-ONLY access by Operator 2 to HDD0. The object is to enable each nonconcurrent operator to access data held in the other operator's data base. Realize that a WRITE into the other operator's hard drive is absolutely disabled. The potential operator makes an identification entry 230 which might for example be a password or a PIN. A decision block 232 accepts the entry data and attempts to match it with Operator 1 verification data. If a YES match is made, a signal on lines 234-1, 234-2 serves to enable the READ 236 and WRITE 238 facilities 240 of the hard drive HDD0. The signal on line 234 also over 234-3 and enables the READ-ONLY mode 242 of the other 244 hard drive HDD1. If the DBLK 232 does not find an entry match a NO on line 246 conveys the entry data to DBLK 248 which accepts the entry data and attempts to match it with Operator 2 verification data. If a YES match is made, a signal on line 250 branches 250-1,250-2,250-3 and serves to enable the READ and WRITE facilities of hard drive HDD1. The signal on line 250 also reaches over 250-1 and enables the READ-ONLY mode 236 of the other 240 hard drive HDD0. If DBLK 248 does not find an entry match a NO signal on line 249 loops back as a RETRY signal, awaiting an acceptable "Operator Make ID Entry" signal to be delivered by the input source 230. As this shows, a valid Operator 1 has exclusive access to HDD0 and and a shared READ-ONLY access to HDD1. Similarly, a valid Operator 2 has exclusive access to HDD1 and a shared READ-ONLY access to HDD0. Furthermore, Operator 2 and all other potential operators except Operator 1 are absolutely denied WRITE access to HDD0, whilst Operator 1 and all other potential operators except Operator 2 are absolutely denied WRITE access to HDD1. This flow cart of FIG. 6 satisfies the following TRUTH table:

|  | Hard Drive 0 | | Hard Drive 1 | |
| --- | --- | --- | --- | --- |
|  | Read | Write | Read | Write |
| Operator 1 | Y | Y | Y | N |
| Operator 2 | Y | N | Y | Y |

In FIG. 7 a logic flowchart depicts a Supervisory Operator 1 having an independent hard drive HDD3 with full READ-WRITE capability and having full READ-WRITE "override" authority for the Operator 2 and Operator 3 hard drives HDD0 and HDD1. As with the earlier flow charts, an "Operator Make ID Entry" signal 260 is delivered to the Supervisory Operator 1 DBLK 262. A YES decision signal on line 264 denoting supervisor access verification couples 264 via line 264-1 with the HDD0 hard drive 266 and via line 264-2 with the HDD1 hard drive 268. Furthermore, the signal on line 264 couples 264-3 with the HDD3 hard drive 270. In other words, the Supervisor Operator 1 has full READ and WRITE access to BOTH hard drives HDD0 and HDD1, as well as the supervisor's HDD3 hard drive 270.

A non-supervisory entry produces a NO signal on line 272 thereby delivering the entry data 260 to the input of the Operator 2 DBLK 274. If the Operator 2 is recognized, a YES signal on line 276 couples 276-1 with and enables READ and WRITE access to the HDD0 and furthermore couples 276-2 with and enables READ and WRITE access to the HDD1 Conversely, if the Operator 2 is not recognized by DBLK 274, a NO signal on line 278 conveys the input 260 data to the Operator 3 DBLK 280. A match verifying Operator 3 credentials may develop a YES signal on line 282 which enables READ and WRITE exclusive access 282 to the HDD1. A failure of recognition by the DBLK 262,274 or 280 results in a NO signal on line 284 which loops back to RETRY entry data when a potential operator makes another ID entry 260. Observe that the Supervisory Operator 1 has full READ and WRITE access to all hard drives HDD0, HDD1 and HDD3. Operator 2 has full READ and WRITE access to both user hard drives HDD0 and HDD1. Operator 3 has READ and WRITE access limited to HDD1. This flow chart of FIG. 7 satisfies the following TRUTH table:

|  | Hard Drive 0 | | Hard Drive 1 | | Hard Drive 3 | |
| --- | --- | --- | --- | --- | --- | --- |
|  | Read | Write | Read | Write | Read | Write |
| Supervisor 1 | Y | Y | Y | Y | Y | Y |
| Operator 2 | Y | Y | Y | Y | N | N |
| Operator 3 | N | N | Y | Y | N | N |

A conventional PC layout is depicted in functional block form in FIG. 8. This generally shows a so-called IBM type personal computer architecture, but it may be readily related to other types of personal computers, such as Apple and others. A micoprocessor (MPU) 290 is the heart of the computer's hardware and it includes a CPU BUS 292 for data I/O. The BUS 292 further couples with a FPU 294, main memory DRAM 296, a system BIOS-ROM 298 and other bus options 300 which may include several card slots. The BUS 292 also couples with the BUS controller 302, a direct memory access DMA 306, and an interrupt control function 308. Collectively these hardware devices form the most central portion of the computer's computational resources. The DMA 306 and interrupt controller 308 also couple with a bus-like set of DMA and interrupt control lines 310.

A most basic I/O device for nearly any computer is obtained through the keyboard and mouse interface controller 312 which connects with a keyboard 314, usually movably attached to the computer through an umbilical cord 316. Contemporary computer also commonly utilize a mouse 318 or other equivalent "pointing device". The controller 312 also recognizes keyboard entered resets such as the common "3-key reset", e.g. CTL-ALT-DEL generally utilized on IBM compatible computers. As a result a signal is delivered to the reset controller 320, thereby delivering a reset signal 322 to the MPU 290.

The BUS 304 also couples with a real time dock (RTC) and a CMOS memory 324. The CMOS memory, which first appeared in IBM AT class computers generally stores system "set-up" data. In effect, this set-up data provides the computer with a virtual personality, tuned to the preferences of an individual operator and combination of peripherals. The BUS 304 also couples with the system timers and control function 326 which, among other services, provides DRAM refresh pulse to the main memory DRAM 296.

The bus controller 302 also interfaces with an expansion BUS 330. A video processor 332 typically couples with this BUS 330, and the typical video graphics array type of video processor may include a video memory (VRAM) 334. Usually this memory 334 includes a least 1-megabyte of VRAM, and a ROM-BIOS extension usually located at C000:0000 in memory. The video processor delivers its video signal to a display 336 for user viewing.

The expansion BUS 330 further couples with a floppy disk controller 340, typically operating one or two floppy disk drives 342,344.

A hard disk controller 350 also couples with the expansion BUS 330 and in usual practice, the controller is used with one or two hard disk drives 352,354.

A serial port controller 360 couples with the expansion BUS 330 and provides at least one serial port COM1 (else, COM2,COM3,COM4) as an output 362 which may serve to operate a serial (usually RS232C compatible) peripheral device such as a modem 364. A parallel controller 370 also couples with the expansion BUS 330, delivering at least one parallel data signal connection 372, which might drive a printer 374.

These preceding several paragraphs of information to FIG. 8 are provided as an oversight of a generalized prior art embodiment of a typical personal computer, onto which my invention adds operational value. Looking now at FIG. 9, the expansion bus 330 couples with a hard disk drive selector and host adapter 380. A bus data enabled operator recognitor 382 serves to associate operator credential data and together with operator interrogation typically through a keyboard entry, serves to verify one of OPERATOR A 384-1, OPERATOR B 384-2, OPERATOR C 384-3 or a SUPERVISORY OPERATOR 384-4. The selected and verified operator signal on bus 386 enables the HDD selector 380 to enable at least one of the three depicted hard disk drive signal bus lines 390-1,390-2 and 390-3.

According, bus line 390-1 couples with DRIVE A 392-1 which may include hard disk drive devices 3941,3942 and a selection operating system OS-0 and software set 396 preferred by OPERATOR A, for example.

Bus line 390-2 is shown to couple with DRIVE B 392-2 which may further include hard disk drive devices 398-1, 398-2 and a selection of operating system OS-1 and software set 400 preferred by OPERATOR B, for example.

Bus line 390-3 is shown to couple with DRIVE C 392-3 which may further include hard disk drive devices 402-1, 402-2 and a selection of operating system OS-2 and software set 404 preferred by OPERATOR C, for example.

In a preferred embodiment, each operator operates in an isolated mode, absolutely denied access to any other operator's hard disk drive contents. The supervisory operator is, however, able to access all the hard disk drives and their contents. A TRUTH table for this configuration may be shown as:

|  | Hard Drive A | | Hard Drive B | | Hard Drive C | |
| --- | --- | --- | --- | --- | --- | --- |
|  | Read | Write | Read | Write | Read | Write |
| Supervisor | Y | Y | Y | Y | Y | Y |
| Operator 1 | Y | Y | N | N | N | N |
| Operator 2 | N | N | Y | Y | N | N |
| Operator 3 | N | N | N | N | Y | Y |

A typical hard disk drive controller is shown in FIG. 10 for purpose of understanding not so much the explicit implementation of my invention, but rather to provide gasp of the objective essence for gaining various implementations for my invention as my be deduced by engineers or other persons skilled in this art field. In this generalized controller, representative of a ST412/506 configuration. As is well known, older PC systems of the XT genera required a ROM-BIOS extension to accept a hard drive. Usually the BIOS is located on a controller or host adapter circuit board. The extended BIOS is commonly accessible at location C800:0000, although occasionally other memory locations might be used. In this depiction, a backplane bus 330-1 which corresponds with the expansion bus 330 of FIG. 8 couples ADDRESS information with a port decoder and DATA with the disk controller device 410. A common drive bus 412 couples with each of one or two disk drives 414-1, 414-2.

The disk controller which I show is adapted to incorporate the essence of my invention by inclusion of two extra signals REN (read enable) 416 and WEN (write enable) 418. Assuming a HIGH state serves to enable the function, the following table may represent operation of the controller:

|  | CONTROL LINE STATUS | |
| --- | --- | --- |
|  | REN | WEN |
| Drive(s) ENABLED | 1 | 1 |
| Drive(s) DISABLED | 0 | 0 |
| Drive(s) R/ONLY | 1 | 0 |

Satisfaction of my invention's essence is obtained when two or more controllers of FIG. 10 are utilized with each controlling a separate set of one or two hard disk drives. Thus, by applying 0 logic level to at least the WEN port of a first controller and a 1 logic level to a second controller, access to the first controller is absouutely denied when the second controller is in use. Making the first controller usable by a USER A and the second controller usable by a USER B converts this condition into a setting where the USER B is able to use the second controller and its associated hard disk drive(s) in a normal manner, while the first controller and its associated hard disk drive(s) are absolutely denied access by the USER B. As a result, corruption of USER A files by USER B is prevented. Obviously, reversing the logic levels where a 1 logic level is applied to the REN ad WEN port of the first controller and a 0 logic level to at least the WEN port of the second controller prevents the USER A from corrupting the USER B disk drive contents.

An IDE type of harddisk drive is generally depicted in FIG. 11 which includes the essential elements for a drive usable in conjunction with another mode for practicing my invention. The hard drive controller (sometimes called a host adapter) 420 receives data signals from the computer's expansion bus 330-2. The data signals couple 422 with a data storage and retrieval subsystem 5, including a data separator 424, zone bit recording circuitry 426, a write data bus 428 and a read/write multiplexer 430 including read/write circuitry 432 which couples 434 with read/write heads 436 associated with the hard disk 450-1,450-2. The read heads are positioned over the disk surface by utlizing an armature 452 usually coupled with a voice coil actuator 454.

The voice coil actuator movement 456 is in turn controlled by a track hold/seek servo loop 6, which receives signals 470 picked up from the rotating media disk 450-2 and read 472, thereby driving a servo demodulator 474, a servo controller 476 and a servo driver 478 that together with a trajectory generator 480 and support circuitry 482 delivers a suitable control signal to the voice coil 454 to accurately position the set of read/write heads 436 to various formatted tracks of data on the disks. The disks are rapidly spun by a spin motor 460, utilizing a motor driver 462 coupled a source of DC electric power 464. The spin motor 460 generally develops a disk rotational speed set in the range 3,600 to over 5,400 RPM.

In a READ mode, data picked up by the heads 436 is delivered through the read/write muliplexer on signal lines 438 with a pulse detector 440 and read data processor 442. An output is produced 444 which, via way of the data separator, feeds through the signal bus 422 and the hard drive controller to the computer's data bus 330-2.

In FIG. 12 I show an extension of the principles of FIG. 11 to suit practice of my invention. This particular embodiment is novel in that a single hard disk drive having tow or more media disk is shown to provide absolutely private division of data storage between two or more nonconcurrent users. The computer's data bus 330-3 couples with the hard disk drive interface (again, sometimes called a host adapter) 490 having an output 492 that couples with a user A/B R/W mode select 494 which includes a ROM extension 496 that includes user ID information. A user ID interface 498 recognizes a valid USER A or USER B (and rejects invalid user attempts). If USER A is recognized an encoded READ enablement signal appears on line 500-1 and an encoded WRITE enablement signal may appear on line 500-2. Depending upon the exact structure of a truth table enabled by the mode selector 494, several combinations of operable may be acheived.

|        | Media Disk 0 | | Media Disk 1 | |
|--------|------|-------|------|-------|
|        | Read | Write | Read | Write |
| User A | Y    | Y     | N    | N     |
| User B | N    | N     | Y    | Y     |

Note:
Media Disk 0 = Disk 450-1
Media Disk 1 = Disk 450-2

In the preceding truth table, Media Disk 450-1 is assigned exclusive use by the USER A whilst Media Disk 450-2 is accordingly assigned exclusive use by the USER B. Thus, absoulute isolation between the work of USER A and USER B is assured. For example, even if USER B "screws up" and performs a reformat or picks up a virus on media disk 1, it will not affect the media disk 0 contents. Conversely, problems which may afflict the USER A media disk 0 will not reach over and damage the private contents of media disk 1 used by the USER B.

|        | Media Disk 0 | | Media Disk 1 | |
|--------|------|-------|------|-------|
|        | Read | Write | Read | Write |
| User A | Y    | Y     | Y    | N     |
| User B | Y    | N     | Y    | Y     |

This preceding truth table extends on the previously described operation in that USER A may READ ONLY the contents of USER B Media Disk 1 and likewise, USER B may READ ONLY the contents of USER A Media Disk 0. No WRITE between the user's assigned media disks is allowed, however. Therefore corruption is blocked and data integrity of a co-users media disk is assured.

|        | Media Disk 0 | | Media Disk 1 | |
|--------|------|-------|------|-------|
|        | Read | Write | Read | Write |
| User A | Y    | Y     | Y    | N     |
| User B | N    | N     | Y    | Y     |

With the preceding truth table, I show that a superior USER A may READ ONLY data contents of media disk 1, while USER B may not gain even READ access to media disk 0.

Separate USER A and USER B read/write multiplexers 510-1,510-2 are used. DATA read from or writting to disk 450-1 couples via bus 520-1 with the multiplexer 510-1. In a like way, DATA read from or writing to disk 450-2 routes over bus 520-2 with the multiplexer 510-2. The read/write circuits 512-1,512-2 each include REN (read enable) and WEN (write enable) ports, coupled via lines 506-1,506-2 with the read enabler 502, and via 508-1,508-2 with the write enabler 504. A matrix of logic states delivered over the lines 500-1,500-2 serves to determine the unique READ and WRITE combination in satisfaction of the preceding truth table indications, or some variation thereof. The multiplexers 510-1,510-2 couple with a data bus 522 that couples with a pulse detector 524 and read data processor 526 to deliver a read signal on line 528, coupling with a data separator 514 and a zone bit recording circuit device 516.

Specific hardware examples for some of the key components or functions I show may be satisfied by the following choices (made by Micro Linear Corporation, San Jose, Calif.), or their equivalents.

Selections for FIGS. 11 and 12

| Element | Type | Description |
|---------|------|-------------|
| 424,514 | ML4025 | Data Separator |
| 426,516 | ML4417 | Zone Bit Recording Circuit |
| 430,510-1,510-2 | ML117 | Read/Write Circuit w/multiplexer |
| 440,524 | ML8464 | Pulse Detector |
| 442,526 | ML4041 | Read Data Processor |
| 474 | ML4401 | Servo Demodulator |
| 476 | ML4403 | Servo Controller |
| 478 | ML4402 | Servo Driver |
| 480 | ML4404 | Trajectory Generator |

In FIG. 12, the WEN and REN inputs to the read/write circuitry 510-1,510-2 may be achieved through utilization of the R/W and /CS inputs of the MicroLogic ML117, together with supplemental gate logic to satisfy a truth table which may look like:

| MicroLogic ML117 Port Status | | |
|---|---|---|
| STATUS | ICS Port | R/W Port |
| DISABLED | 1 | X |
| READ | 0 | 1 |
| WRITE | 0 | 0 |

In FIG. 13 I show a variant technique methodology for achieving my invention's operational essence. A hard disk drive host adapter 530 couples with the expansion bus 330 and control line 310, portions of a PC assembled along the lines of that which is depicted in FIG. 8. The host adapter 530 usually interfaces directly to a hardisk drive. Case in point is an IDE hard disk drive which may couple directly to the output of an IDE host adapter as well known art. Enter now my invention 7 as a hard disk drive selector interposed between the host adapter output bus 532 (actually an I/O bus) and plurally intercoupled 544-1,544-2,544-3,544-4 with any of several hard disk drives 546-1,546-2,546-3,546-4. While these drives may be IDE or SCSI types, this shall not preclude any hard drive intercoupling scheme or standard, including those which are sometimes described as proprietary. The exact type of drive bussing is irrelevant to the substance of my invention. Usually only one HDD selector 534 output HD0-HD3 is enable for any given user, although some exception is made when READ ONLY access of another user's drive is intentionally permitted, as mentioned earlier. In any event, a selection determinator 536 "decides" which output is to become active in immediate response to a USER (or USER CLASS) authorization signal delivered to the selection determinator by an external recognitor 538. A hopeful use makes operator entry of a PIN or password, perhaps through a keypad 540 which delivers the entry 542 to the recognitor 538 where the user's credentials are verified and if a match is obtained, a signal is delivered to the determinator 536.

A variation of the selection methodology of FIG. 13 is shown in FIG. 14. In this setup, the hard disk drive selector is combined with the host adapter 550 in a controller such as a plug-in expansion bus card 8. The controller also includes a BIOS ROM extension 552 (usually in combination with the HDD BIOS ROM extension) which couples either through the expansion bus as linked through bus 556. Alternatively an alternate BIOS bus 514 might be more convenient in certain hardware construction. In any event, the extended BIOS ROM 512 couples with the system BIOS ROM to be effective at least during POST. The intent is to interrogate a potential operator for a PIN or password which is typically entered through the system keyboard. The operator's response, if valid, determines which hard disk drive may be coupled with the computer's hardware resources via host adapter 510 selection ports 588-1,558-2,558-3 (e.g., HDA,HDB,HDC)

In a PC during POST, a scan of the BIOS ROM 560 and including any extension BIOS ROM is made, starting with a pointer location 562 as shown in a flowchart of FIG. 15. The pointer location is usually C000:0000 and it looks for a succession of 2,048 byte (2-KB) blocks of BIOS data starting at the pointer location, which is typically the video BIOS location. A DBLK 564 looks for an initial BIOS ID of 55AH for the first two bytes at each step. If the BIOS ID 55AH appears, a YES on line 566 enables the BIOS initialization call 568 which, upon completion passes to DBLK 572. If the location is less than F400:0000 a NO appears on line 574 and the pointer state 576 is incremented by 2,048 bytes (or 800H), coupling on line 578 where it re-enters the DBLK 564 to search next memory location for BIOS ROM code presence. Upon completion of this sequence the DBLK 562, upon recognizing a reaching of a final BIOS location F400:0000, passes to the procedural END 580.

Mentioned earlier for FIG. 1, I show a CMOS (complementary metal oxide semiconductor) memory device 590 or NVR (non-volatile RAM) in FIG. 16 which, under common practice is included with the RTC (real time clock), is utilized as a set-up memory which is coupled with the CPU BUS 292 as an extension of FIG. 8. A Motorola MC146818 integrated circuit is a typical combination RTC and CMOS memory device upon which more contemporary designs are derived. Usually the CMOS. In the CMOS memory, byte 18 holds information about two possible hard disk installations. The high order nibble indicates the first hard drive type, while the low order nibble position indicates the second hard drive type. A value 0000 in either nibble position indicates "none installed". It is therefore possible to practice my invention by utilizing either of the operator verification recognitors 592-1,592-2 to poke a 0000 state into the appropriate byte 18 nibble portion. In other words, if the first hard drive is assigned to Operator 1 and the second hard disk drive is assigned to Operator 2, the following combination may be entered:

| >>CMOS BYTE 18 << | | |
|---|---|---|
| ENABLED USER | HIGH NIBBLE | LOW NIBBLE |
| OPERATOR 1 | #### | 0000 |
| OPERATOR 2 | 0000 | #### |

In this table denotation #### indicates a "don't care" where whatever data which may b entered is appropriate for the correspondingly active hard drive in the range 0001 to 1111. As a result of this poking of 0000 into the nibble location, it behooves the verification recognizer 592-1,592-2 to first retrieve and store the true hard drive data in each nibble location before changing the nibble to 0000, lest the information be lost. This is attainable in two ways: one the data may be read-out and stored in a non-volatile holding memory, perhaps as a portion of one of the recognitors; or, the CMOS memory may have two byte 18 equivalent locations which are selectable as an Operator 1 byte and an Operator 2 byte. In this latter arrangement, it is merely necessary for the Operator verification signal to select one or the other byte 18 equivalent locations to achieve hard disk drive selection correspondent with the verified and enabled operator. The artisan choosing to use this approach of CMOS memory byte-level editing to achieve control over which hard drive is used by the instant operator is reminded that poking byte changes directly into the CMOS memory also entails recalculation of and subsequent revision of the checksum bytes 46 and 47.

In some hard disk drives, switching the hard drive power supply 600 +12 VDC line between a first HDD0 hard drive 602-1 and a second HDD1 hard drive 602-2 shown in FIG. 17 may suffice to switch between drives. Obviously, lack of +12 VDC stops the platter spin, and this "failure" may translate into the HDD being absent. In particular if tristate logic is used for signal and data lines in the HDD, removing power from the HDD usually makes the HDD transparent to the rest of the system. Although I don't especially show it, switching the +5 VDC logic power (particularly if tristate logic is used) may also be used to effect equivalent HDD disablement.

In FIG. 18 I show the external recognizor 538-1 of earlier FIG. 13 to include any of several possible approaches for operator credential verification. A keypad 610 allows manual entry of PIN or password data, creating a credential data signal which may be coupled 612 with the recognizor 538-1. A hopeful user makes entry 614 of a PIN or password and if the combination is correct, the user is recognized.

In another approach, a plastic card 620 embodied with a magnetic stripe 622 (similar to well known credit card construction) is read by a pickup 624 and reader 626 which converts the magnetic encoded signals into credential data signals coupled 628 with the recognizor 538-1. A variation on this is to utilize a plastic card 630 which includes a microprocessor and memory 632 in the form of a so-called "smart card". The card is read by a receptor 634 and a smart card interface 636, delivering credential data signals 638 to the recognizor 538-1.

Utilizing my arrangement shown in FIG. 19 I teach that the PC is essentially "born dead" unless a floppy disk or CD-ROM is inserted which has operator unique access data available for reading by the system. Although BOOT sector tracks may be available on the hard disk drive, no access to the BOOT track can be obtained by a user except through utilizing the content of the floppy disk or CD-ROM. In this arrangement which I have demonstrated on several PC's, the hard disk drives are inaccessible unless selectively enabled by unique data on the floppy disk drive. The approach is to provide each user with a user-specific floppy disk drive which has encrypted data for user verification, together with appropriate system enablement and setup data giving the user unique access to just those portions of a system to which he may be properly entitled. Aside from the obvious use for selecting a specific hard disk drive for his utilization, while denying access to other physically installed hard disk drives this approach may also limit access to other system assets. For example, one operator may have use of an ink-jet or laser printer, while the other may be limited to a dot-matrix printer, and so forth. In use and usually after the POST and BOOT cycle has gone far enough for the FDD controller 62-1 to become active, a floppy disk 640 is inserted 642 into the FDD0 device 64-1. Data on the floppy disk 640 is read and the earlier mentioned user specific enablement steps occur. Similarly, a CD-ROM 650 maybe inserted 652 into the CD-ROM reader 72-1. If the CD-ROM is loaded with user specific setup and enablement data, the CD-ROM serves as a user specific key for enabling selected portions of the shared system hardware, most notably the hard disk drive resources.

An approach which I prefer for user authorization is shown in FIG. 20 to include an extended CMOS memory selection 660 subsystem coupled with the CPU bus 292 and which, as depicted in the figure includes three CMOS-RAM portions 662-1, 662-2, 662-3 Operator or user credential verification 664-1, 664-2, 664-3 is nonconcurrently obtained from the hopeful users 666-1, 666-2, 666-3. A pure form of distinct separation of user overlap is obtained with this approach, for the CMOS memory in an ordinary PC includes a personally selected setup for different preferences for system operation, including video display modes (e-g, interlace or noninterlaced, etc), port assignments, diskette selection, keyboard characteristics, etc. As a result the operating personality of the shared hardware system is tailored to each user as thoroughly as if the shared system was his own private PC during his enabled period of usage.

I anticipate and even expect that a skilled artisan may develop the details of my invention's implementation with considerable variation regarding hookup, hardware details, software configuration and even operational preferences. Such alternate schemes obviously result from mere computer science and engineering skill coupled with the plethora of parts, components and programming skills which might be utilized to construct computer hardware apparatus and software code according to the underlying teachings of my invention.

Any attempt by another to circumvent the essence of my invention shall be prudently viewed with caution and suspicion. I realize that hindsight may make other physical embodiments exhibiting a difference in implementation detail from that which I depict readily apparant to and subsequently practiced by others. Consequently, all such practical hookup variations and software code techniques, irrespective of their extent, shall be found as obvious variations on my invention illustrative implementations and to be irrefutably within the scope of my invention as taught and claimed.

What I claim for my invention is:

1. Computer system hardware resource sharing method which enables at least two non-concurrent users to exercise functionally separate operational access to the computer system's hardware resources while maintaining substantially incorruptible operating system and program software integrity for each user, comprising steps of:

sharing a common utilization of at least a computational portion, a random access memory portion, and an operator interface portion of the computer system's hardware resources between at least a first user and a second user;

interlinking at least a first hard disk drive and a second hard disk drive with the computer system's hardware resources;

maintaining the first user's operating system software and program files on the first hard disk drive;

maintaining the second user's operating system software and program files on the second hard disk drive;

configuring the computer system's hardware resources to enable a selectable one of at least a first system operating mode enabling the first user access to the first hard disk drive while denying functional access to the second hard disk drive, and a second system operating mode enabling the second user access to the second hard disk drive while denying functional access to the first hard disk drive;

selecting between one of a first interval of operation including the first user and the first system operating mode, and a second interval of operation including the second user and the second system operating mode during an initial ROM-BIOS controlled POST sequence of the computer system and preferably prior to a BOOT of the operating system.

2. The computer system hardware resource sharing method of claim 1 comprising at least one further step of:

enabling the first user READ-ONLY access to the second hard disk drive during the first system operating mode; and, enabling the second user READ-ONLY access to the first hard disk drive during the second system operating mode.

3. The computer system hardware resource sharing method of claim 1 comprising further steps of:

configuring the first hard disk drive to comprise a first platter and the second hard disk drive to comprise a second platter of a shared hard disk drive mechanism;

associating a first read/write head set with the first platter;

associating a second read/write head set with the second platter;

designating an exclusive operability of the first read/write head set and access to the first platter to the first user during the first system operating mode;

designating an exclusive operability of the second read/write head set and access to the second platter to the second user during the second system operating mode.

4. The computer system hardware resource sharing method of claim 1 comprising further steps of:

interrupting a flow of signal data between the computer system's hardware resources and the second hard disk drive during the first system operating mode; and, interrupting a flow of signal data between the computer system's hardware resources and the first hard disk drive during the second system operating mode.

5. The computer system hardware resource sharing method of claim 1 comprising further steps of:

disabling operation of the second hard disk drive mechanism during the first system operating mode; and, disabling operation of the first hard disk drive mechanism during the second system operating mode.

6. The computer system hardware resource sharing method of claim 1 comprising further steps of:

configuring the first hard disk drive as a primary hard drive and disabling the second hard disk drive during the first system operating mode; and, configuring the second hard disk drive as the primary hard drive and disabling the first hard disk drive during the second system operating mode.

7. The computer system hardware resource sharing method of claim 6 comprising a further step of:

incorporating at least the user selection and usually an user credential verification portion of a software code associated with the initial ROM-BIOS controlled POST sequence in a removable storage media firmware the form of which may include at least one of a floppy disk, a compact disk ROM, a magnetically encoded card, and a ROM encoded "smart" card device; and, interlinking the removable storage media firmware with the computer system's hardware resources to establish the user selection and the user credential verification.

8. The computer system hardware resource sharing method of claim 1 comprising a further step of:

incorporating at least the user selection and usually an user credential verification portion of the ROM-BIOS controlled POST sequence of software code associated with the computer system's initial startup sequence into a basic input and output system read only memory BIOS-ROM portion of the computer's hardware resources.

9. The computer system hardware resource sharing method of claim 6 comprising further steps of:

storing at least user selection determination software code and usually an user's credential verification code in a ROM-BIOS extension device;

overlaying and modifying the computer system's ROM-BIOS controlled POST software code portions of at least one of a ROM-BIOS device and a CMOS memory device portion of the computer's hardware resources to include user credential interrogation upgrade software code stored in the ROM-BIOS extension device;

whereby prompting for the imminent user selection determination may include a potential user's credential interrogation during a portion of the initial ROM-BIOS controlled BOOT sequence.

10. The computer system hardware resource sharing method of claim 1 comprising at least one further step of:

interlinking at least a third hard disk drive with the computer system's hardware resources;

including a set of shareable data files on the third hard disk drive;

sharing a READ level of access to file data stored on the third hard disk drive by at least the first user and the second user.

11. The computer system hardware resource sharing method of claim 1 comprising further steps of:

selecting a supervisory level of operation including a supervisory user during an initial BOOT sequence of the computer system;

enabling the supervisory user a substantially unlimited READ and WRITE level of access to the plurality of hard disk drives comprising the computer system's hardware resources.

12. The computer system hardware resource sharing method of claim 1 comprising further steps of:

refitting an existent computer system's hardware resources to include an adapter enabling a selection capability between at least the first system operating mode and the second system operating mode.

13. Computer system hardware resource sharing method that enables a plurality of users to have functionally separate operational access to a computer system's hardware resources while maintaining a substantially incorruptible operating system and software integrity for each user, comprising steps of:

accessing a first interval of computer operation by a first user;

accessing a second interval of computer operation by a second user;

sharing a common utilization of at least a computational portion, a random access memory portion, and an operator interface portion of the computer system's hardware resources;

interlinking at least a first hard disk drive and a second hard disk drive with the computer's hardware resources;

maintaining the first user's operating system software and program files on the first hard disk drive;

maintaining the second user's operating system software and program files on the second hard disk drive;

fitting the computer system's hardware resources to include a user selection adapter enabling a mutually exclusive selection of:

1. a first system operating mode enabling the first user to access the first hard disk drive and concurrently denying the first user a functional access to at least the second hard disk drive;

2. a second system operating mode enabling the second user to access the second hard disk drive and concurrently denying the second user a functional access to at least the first hard disk drive;

and, determining user selection to preferably occur during an initial ROM-BIOS controlled POST, or BOOT sequence of the computer system.

14. The computer system hardware resource sharing method of claim 13 comprising at least one further step of:

enabling the first user a READ-ONLY access to the second hard disk drive; and, enabling the second user a READ-ONLY access to the first hard disk drive.

15. The computer system hardware resource sharing method of claim 13 enabling an effectively independent operation of the computer system with mutually incompatible operating systems comprising further steps of:

formatting the first hard disk drive device with a first disk operating system format;

formatting the second hard disk drive device with a second disk operating system format;

installing a set of first operating system software, usually including first system BOOT data and device driver data, on the first hard disk drive device; and, installing a set of second operating system software, usually including second system BOOT data and device driver data on the second hard disk drive device.

16. The computer system hardware resource sharing method of claim 13 comprising further steps of:

extending data comprising a BIOS-ROM portion of the computer system's hardware resources with user interrogation and selection code data to thereby enable the user selection adapter to establish alternate start-up selection of one of the first system operating mode and the second system operating mode.

17. The computer system hardware resource sharing method of claim 13 comprising further steps of:

interlinking at least a third hard disk drive with the computer's hardware resources;

a third system operating mode enabling a supervisory user to exclusive WRITE access and shared READ access of the third hard disk drive;

maintaining the supervisory user's selection of software files on the third hard disk drive;

enabling at least one of the first user and the second user a READ-ONLY access privilege to the third hard disk drive; and, denying the first user and the second user WRITE access privilege to the third hard disk drive device.

18. The computer system hardware resource sharing method of claim 13 comprising further steps of:

interlinking at least a third hard disk drive with the computer's hardware resources;

enabling at least one of the first user and the second user a WRITE access privilege to the third hard disk drive device; and, enabling at least one of the first user and the second user a READ access privilege to the third hard disk drive.

19. The computer system hardware resource sharing method of claim 13 comprising further steps of:

expanding capacity of a CMOS setup memory portion of the computer system to include at least two separate portions of the expanded capacity;

entering separate setup preference data for at least the first user and the second user into the separate portions of the expanded capacity said CMOS setup memory;

verifying an immediate user as one of at least the first user and the second user; and, enabling the separate portion of CMOS setup memory storing the setup preference data corresponding with the verified said immediate user.

20. Computer system hardware resource sharing means enabling at least two mutually nonconcurrent users to share common portions of a computer hardware means while maintaining a functionally separate operating environment for each user, therefor comprising:

the computer hardware means including at least a microprocessor means, a memory means, a power supply means, and a user interface means;

a nonconcurrent user access selection control means enabling a mutually exclusive selection of at least one of a first user and a second user:

a first hard disk drive means including the first user's set of personified software;

a second hard disk drive means including the second user's set of personified software;

a first user access control means responsive to an exclusive selection of the first user and thereupon enable a first system operating mode including a first user READ access utilization and usually a first user WRITE access utilization of the first hard disk drive means;

a second user access control means responsive to an exclusive selection of the second user and thereupon enable a second system operating mode including a second user READ access utilization and usually a second user WRITE access utilization of the second hard disk drive means;

a first exclusion means for deactivating the second hard disk drive means concurrent with the first system operation mode; and, a second exclusion means for deactivating the first hard disk drive means concurrent with thee second system operation mode.

21. The computer system hardware resource sharing means of claim 20 further comprising:

a combination hard disk drive means comprising a first media platter means and a second media platter means rotationally driven by a mutually shared motor drive mechanism;

a first READ and WRITE head means cooperative with the first media platter means;

a second READ and WRITE head means cooperative with the second media platter means;

a first enablement means for obtaining exclusive operability of the first READ and WRITE head means in combination with the first media platter means during the first system operating mode; and, a second enablement means for obtaining exclusive operability of the second READ and WRITE head means in combination with the second media platter means during the second system operating mode.

22. The computer system hardware resource sharing means of claim 20 further comprising:

the user access selection control means enabling the selection of a supervisory user:

a third hard disk drive means including a supervisory user's set of software;

a shared access control means responsive to the selection of at least one of the first user and the second user and thereupon enable READ utilization of the file data residing on the third hard disk drive means; and, a third access control means responsive to the selection of the supervisory user and thereupon enable READ and WRITE utilization of the third hard disk drive means by the supervisory user.

23. The computer hardware sharing means of claim 20 further comprising:

a ROM-BIOS extension means including software code supporting the nonconcurrent user selector means; and, an inclusion means enabling a software code level superimposition of the software code of the ROM-BIOS extension means with a ROM-BIOS means portion of the computer hardware means to thereby enable the nonconcurrent user selector means and interrogate user selection credentials of a pending user preferably during a BOOT sequence.

24. The computer system hardware resource sharing means of claim 20 further comprising:

a credential means for identifying a user including a software code supporting said identification; and, an interface means coupling the credential means with the computer hardware means.

* * * * *